United States Patent
Rosenberg

(10) Patent No.: US 10,609,124 B2
(45) Date of Patent: *Mar. 31, 2020

(54) DYNAMIC SYSTEMS FOR OPTIMIZATION OF REAL-TIME COLLABORATIVE INTELLIGENCE

(71) Applicant: Unanimous A. I., Inc., San Francisco, CA (US)

(72) Inventor: Louis B. Rosenberg, San Luis Obispo, CA (US)

(73) Assignee: Unanimous A.I., Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/130,990

(22) Filed: Sep. 13, 2018

(65) Prior Publication Data

US 2019/0014170 A1    Jan. 10, 2019

Related U.S. Application Data

(63) Continuation of application No. 15/052,876, filed on Feb. 25, 2016, now Pat. No. 10,110,664, which is a
(Continued)

(51) Int. Cl.
*H04L 29/08* (2006.01)
*G06F 3/0482* (2013.01)
(Continued)

(52) U.S. Cl.
CPC ............ *H04L 67/10* (2013.01); *E21B 47/122* (2013.01); *E21B 47/18* (2013.01); *G06F 3/0482* (2013.01);
(Continued)

(58) Field of Classification Search
CPC ............ G06F 3/04842; G06F 3/04883; G06F 3/0482; G06F 3/04847; H04L 67/10;
(Continued)

(56) References Cited

U.S. PATENT DOCUMENTS 5,236,199 A    8/1993    Thompson, Jr.
5,400,248 A    3/1995    Chisholm
(Continued)

FOREIGN PATENT DOCUMENTS

CA    2414397    8/2003
EP    3123442    2/2017
(Continued)

OTHER PUBLICATIONS

"Dialogr—A simple tool for collective thinking"; Mar. 25, 2015; http://www.dialogr.com./; 1 page.
(Continued)

*Primary Examiner* — Amy M Levy
(74) *Attorney, Agent, or Firm* — Fitch, Even, Tabin & Flannery LLP

(57) ABSTRACT

Systems and methods for real-time collaborative computing and collective intelligence are disclosed. A collaborative application runs on a collaborative server connected to a plurality of computing devices. Collaborative sessions are run wherein a group of independent users, networked over the internet, collaboratively answer questions in real-time, thereby harnessing their collective intelligence. Systems and methods for determining a group intent vector from a plurality of user intent vectors in response to user input, the group intent vector including a bias restoring vector to correct positional bias resulting from a target layout.

5 Claims, 9 Drawing Sheets

Related U.S. Application Data continuation-in-part of application No. 15/047,522, filed on Feb. 18, 2016, now Pat. No. 10,133,460, and a continuation-in-part of application No. 15/017,424, filed on Feb. 5, 2016, now abandoned, and a continuation-in-part of application No. 14/925,837, filed on Oct. 28, 2015, and a continuation-in-part of application No. 14/920,819, filed on Oct. 22, 2015, now Pat. No. 10,277,645, and a continuation-in-part of application No. PCT/US2015/056394, filed on Oct. 20, 2015, and a continuation-in-part of application No. 14/859,035, filed on Sep. 18, 2015, now Pat. No. 10,122,775, and a continuation-in-part of application No. PCT/US2015/035694, filed on Jun. 12, 2015, and a continuation-in-part of application No. 14/738,768, filed on Jun. 12, 2015, now Pat. No. 9,940,006, and a continuation-in-part of application No. 14/708,038, filed on May 8, 2015, now abandoned, and a continuation-in-part of application No. PCT/US2015/022594, filed on Mar. 25, 2015, and a continuation-in-part of application No. 14/668,970, filed on Mar. 25, 2015, now Pat. No. 9,959,028.

(60) Provisional application No. 62/120,618, filed on Feb. 25, 2015, provisional application No. 62/117,808, filed on Feb. 18, 2015, provisional application No. 62/113,393, filed on Feb. 7, 2015, provisional application No. 62/069,360, filed on Oct. 28, 2014, provisional application No. 62/067,505, filed on Oct. 23, 2014, provisional application No. 62/066,718, filed on Oct. 21, 2014, provisional application No. 62/012,403, filed on Jun. 15, 2014, provisional application No. 61/991,505, filed on May 10, 2014, provisional application No. 61/970,885, filed on Mar. 26, 2014.

(51) Int. Cl.
*G06F 3/0488* (2013.01)
*G06F 3/0484* (2013.01)
*H04L 29/06* (2006.01)
*E21B 47/12* (2012.01)
*E21B 47/18* (2012.01)

(52) U.S. Cl.
CPC ...... *G06F 3/04842* (2013.01); *G06F 3/04847* (2013.01); *G06F 3/04883* (2013.01); *H04L 67/12* (2013.01); *H04L 67/14* (2013.01); *H04L 69/24* (2013.01)

(58) Field of Classification Search
CPC ......... H04L 69/24; H04L 67/14; H04L 67/12; E21B 47/18; E21B 47/122
See application file for complete search history.

(56) References Cited

U.S. PATENT DOCUMENTS

| | | | |
|---|---|---|---|
| 5,808,908 A * | 9/1998 | Ghahramani | G06F 11/3419 702/182 |
| 6,064,978 A | 5/2000 | Gardner | |
| 6,480,210 B1 | 11/2002 | Martino | |
| 6,944,596 B1 * | 9/2005 | Gray | G06Q 10/1053 434/107 |
| 7,031,842 B1 | 4/2006 | Musat | |
| 7,158,112 B2 | 1/2007 | Rosenberg | |
| 7,489,979 B2 | 2/2009 | Rosenberg | |
| 7,542,816 B2 | 6/2009 | Rosenberg | |
| 7,562,117 B2 | 7/2009 | Rosenberg | |
| 7,603,414 B2 | 10/2009 | Rosenberg | |
| 7,831,928 B1 | 11/2010 | Rose | |
| 7,917,148 B2 | 3/2011 | Rosenberg | |
| 7,937,285 B2 | 5/2011 | Goldberg | |
| 8,176,101 B2 | 5/2012 | Rosenberg | |
| 8,589,488 B2 | 11/2013 | Huston | |
| 8,745,104 B1 | 6/2014 | Rosenberg | |
| 8,762,435 B1 | 6/2014 | Rosenberg | |
| 9,483,161 B2 * | 11/2016 | Wenger | G06F 3/0482 |
| 9,710,836 B1 * | 7/2017 | O'Malley | G06Q 30/0607 |
| 9,940,006 B2 | 4/2018 | Rosenberg | |
| 9,959,028 B2 | 5/2018 | Rosenberg | |
| 10,110,664 B2 | 10/2018 | Rosenberg | |
| 10,122,775 B2 | 11/2018 | Rosenberg | |
| 10,133,460 B2 | 11/2018 | Rosenberg | |
| 10,222,961 B2 | 3/2019 | Rosenberg | |
| 10,277,645 B2 | 4/2019 | Rosenberg | |
| 10,310,802 B2 | 6/2019 | Rosenberg | |
| 10,353,551 B2 | 7/2019 | Rosenberg | |
| 10,416,666 B2 | 9/2019 | Rosenberg | |
| 10,439,836 B2 | 10/2019 | Rosenberg | |
| 2001/0042010 A1 | 11/2001 | Hassell | |
| 2002/0042920 A1 | 4/2002 | Thomas | |
| 2002/0129106 A1 | 9/2002 | Gutfreund | |
| 2002/0171690 A1 | 11/2002 | Fox | |
| 2003/0065604 A1 * | 4/2003 | Gatto | G06Q 40/06 705/36 R |
| 2003/0079218 A1 * | 4/2003 | Goldberg | G06Q 10/10 725/13 |
| 2004/0210550 A1 | 10/2004 | Williams | |
| 2005/0067493 A1 | 3/2005 | Urken | |
| 2005/0075919 A1 | 4/2005 | Kim | |
| 2005/0168489 A1 | 8/2005 | Ausbeck | |
| 2005/0218601 A1 * | 10/2005 | Capellan | A63F 9/00 273/430 |
| 2005/0261953 A1 | 11/2005 | Malek | |
| 2006/0147890 A1 * | 7/2006 | Bradford | G09B 7/00 434/362 |
| 2006/0200401 A1 | 9/2006 | Lisani | |
| 2006/0250357 A1 | 11/2006 | Safai | |
| 2007/0039031 A1 | 2/2007 | Cansler, Jr. | |
| 2007/0072156 A1 * | 3/2007 | Kaufman | G16H 20/60 434/236 |
| 2007/0097150 A1 * | 5/2007 | Ivashin | G06F 3/0485 345/660 |
| 2007/0099162 A1 * | 5/2007 | Sekhar | G06Q 30/02 434/323 |
| 2007/0124503 A1 | 5/2007 | Ramos | |
| 2007/0211050 A1 * | 9/2007 | Ohta | G06F 3/0346 345/426 |
| 2007/0220100 A1 | 9/2007 | Rosenberg | |
| 2008/0015115 A1 * | 1/2008 | Guyot-Sionnest | G06F 3/014 506/24 |
| 2008/0091777 A1 * | 4/2008 | Carlos | G06Q 10/10 709/204 |
| 2008/0103877 A1 * | 5/2008 | Gerken | G06Q 30/02 705/7.32 |
| 2009/0037355 A1 | 2/2009 | Brave | |
| 2009/0063379 A1 * | 3/2009 | Kelly | G06Q 10/00 706/46 |
| 2009/0063463 A1 * | 3/2009 | Turner | A63F 13/12 |
| 2009/0063991 A1 * | 3/2009 | Baron | G06Q 10/10 715/751 |
| 2009/0063995 A1 | 3/2009 | Baron | |
| 2009/0125821 A1 | 5/2009 | Johnson | |
| 2009/0239205 A1 * | 9/2009 | Morgia | G06Q 10/10 434/362 |
| 2009/0254425 A1 * | 10/2009 | Horowitz | G06Q 10/10 705/300 |
| 2009/0254836 A1 | 10/2009 | Bajrach | |
| 2009/0287685 A1 | 11/2009 | Charnock | |
| 2009/0325533 A1 * | 12/2009 | Lele | G06F 1/3209 455/343.1 |
| 2010/0023857 A1 | 1/2010 | Mahesh | |
| 2010/0145715 A1 | 6/2010 | Cohen | |
| 2010/0169144 A1 * | 7/2010 | Estill | G06Q 10/0637 705/7.36 |
| 2010/0174579 A1 * | 7/2010 | Hughes | G06Q 10/06311 705/7.13 |

(56) References Cited

U.S. PATENT DOCUMENTS

| | | | |
|---|---|---|---|
| 2010/0205541 A1* | 8/2010 | Rapaport | G06Q 10/10 715/753 |
| 2010/0299616 A1 | 11/2010 | Chen | |
| 2011/0016137 A1* | 1/2011 | Goroshevsky | G06Q 30/02 707/758 |
| 2011/0080341 A1 | 4/2011 | Helmes | |
| 2011/0087687 A1* | 4/2011 | Immaneni | G06F 16/148 707/769 |
| 2011/0119048 A1* | 5/2011 | Shaw | G06F 17/279 704/9 |
| 2011/0141027 A1* | 6/2011 | Ghassabian | G06F 3/0237 345/168 |
| 2011/0166916 A1 | 7/2011 | Inbar | |
| 2011/0208822 A1* | 8/2011 | Rathod | G06F 16/9535 709/206 |
| 2011/0320536 A1* | 12/2011 | Lobb | G06Q 50/01 709/205 |
| 2012/0005131 A1 | 1/2012 | Horvitz | |
| 2012/0011006 A1* | 1/2012 | Schultz | G06Q 10/10 705/14.73 |
| 2012/0013489 A1 | 1/2012 | Earl | |
| 2012/0072843 A1* | 3/2012 | Durham | G06F 3/041 715/733 |
| 2012/0079396 A1* | 3/2012 | Neer | G06Q 10/107 715/745 |
| 2012/0088220 A1 | 4/2012 | Feng | |
| 2012/0109883 A1* | 5/2012 | Iordanov | G06Q 10/101 707/608 |
| 2012/0179567 A1* | 7/2012 | Soroca | G06Q 30/08 705/26.3 |
| 2012/0191774 A1 | 7/2012 | Bhaskaran | |
| 2012/0290950 A1 | 11/2012 | Rapaport | |
| 2012/0316962 A1* | 12/2012 | Rathod | G06Q 10/107 705/14.54 |
| 2013/0013248 A1 | 1/2013 | Brugler | |
| 2013/0041720 A1 | 2/2013 | Spires | |
| 2013/0097245 A1* | 4/2013 | Adarraga | H04L 65/403 709/204 |
| 2013/0160142 A1 | 6/2013 | Lai | |
| 2013/0171594 A1* | 7/2013 | Gorman | G09B 5/00 434/219 |
| 2013/0231595 A1* | 9/2013 | Zoss | A61H 1/0255 601/34 |
| 2013/0298690 A1* | 11/2013 | Bond | G01L 5/0052 73/788 |
| 2013/0300740 A1 | 11/2013 | Snyder | |
| 2013/0311904 A1* | 11/2013 | Tien | G06Q 10/10 715/753 |
| 2013/0339445 A1* | 12/2013 | Perincherry | H04L 67/306 709/204 |
| 2014/0047356 A1 | 2/2014 | Ameller-Van-Baumberghen | |
| 2014/0057240 A1* | 2/2014 | Colby | G09B 7/02 434/350 |
| 2014/0089521 A1* | 3/2014 | Horowitz | H04L 67/02 709/239 |
| 2014/0100924 A1 | 4/2014 | Ingenito | |
| 2014/0108915 A1 | 4/2014 | Lu | |
| 2014/0128162 A1* | 5/2014 | Arafat | A63F 13/795 463/42 |
| 2014/0129946 A1 | 5/2014 | Harris | |
| 2014/0162241 A1* | 6/2014 | Morgia | G06Q 30/02 434/362 |
| 2014/0249889 A1 | 9/2014 | Park | |
| 2014/0258970 A1 | 9/2014 | Brown | |
| 2014/0279625 A1* | 9/2014 | Carter | G06Q 50/01 705/319 |
| 2014/0310607 A1* | 10/2014 | Abraham | G06Q 10/1053 715/738 |
| 2014/0316616 A1 | 10/2014 | Kugelmass | |
| 2014/0337097 A1 | 11/2014 | Farlie | |
| 2014/0358825 A1 | 12/2014 | Phillipps | |
| 2014/0379439 A1 | 12/2014 | Sekhar | |
| 2015/0006492 A1* | 1/2015 | Wexler | G06F 16/248 707/694 |
| 2015/0089399 A1* | 3/2015 | Megill | H04L 12/1813 715/753 |
| 2015/0149932 A1* | 5/2015 | Yamada | G06Q 30/02 715/753 |
| 2015/0154557 A1 | 6/2015 | Skaaksrud | |
| 2015/0156233 A1 | 6/2015 | Bergo | |
| 2015/0170050 A1 | 6/2015 | Price | |
| 2015/0192437 A1 | 7/2015 | Bouzas | |
| 2015/0236866 A1 | 8/2015 | Colby | |
| 2015/0242972 A1 | 8/2015 | Lemmey | |
| 2015/0302308 A1* | 10/2015 | Bartek | H04L 67/10 706/46 |
| 2015/0331601 A1 | 11/2015 | Rosenberg | |
| 2015/0347903 A1 | 12/2015 | Saxena | |
| 2016/0034305 A1* | 2/2016 | Shear | G06F 16/245 707/722 |
| 2016/0044073 A1 | 2/2016 | Rosenberg | |
| 2016/0048274 A1 | 2/2016 | Rosenberg | |
| 2016/0057182 A1 | 2/2016 | Rosenberg | |
| 2016/0078458 A1* | 3/2016 | Gold | G06Q 30/0201 705/7.32 |
| 2016/0154570 A1 | 6/2016 | Rosenberg | |
| 2016/0170594 A1 | 6/2016 | Rosenberg | |
| 2016/0170616 A1 | 6/2016 | Rosenberg | |
| 2016/0209992 A1 | 7/2016 | Rosenberg | |
| 2016/0210602 A1 | 7/2016 | Siddique | |
| 2016/0274779 A9 | 9/2016 | Rosenberg | |
| 2016/0277457 A9 | 9/2016 | Rosenberg | |
| 2016/0314527 A1 | 10/2016 | Rosenberg | |
| 2016/0320956 A9 | 11/2016 | Rosenberg | |
| 2016/0357418 A1 | 12/2016 | Rosenberg | |
| 2016/0366200 A1* | 12/2016 | Healy | H04L 65/60 |
| 2017/0223411 A1 | 8/2017 | De Juan | |
| 2017/0300198 A1 | 10/2017 | Rosenberg | |
| 2018/0076968 A1 | 3/2018 | Rosenberg | |
| 2018/0181117 A1 | 6/2018 | Rosenberg | |
| 2018/0196593 A1 | 7/2018 | Rosenberg | |
| 2018/0203580 A1 | 7/2018 | Rosenberg | |
| 2018/0204184 A1 | 7/2018 | Rosenberg | |
| 2018/0217745 A1 | 8/2018 | Rosenberg | |
| 2018/0239523 A1 | 8/2018 | Rosenberg | |
| 2018/0373991 A1 | 12/2018 | Rosenberg | |
| 2019/0034063 A1 | 1/2019 | Rosenberg | |
| 2019/0042081 A1 | 2/2019 | Rosenberg | |
| 2019/0121529 A1 | 4/2019 | Rosenberg | |
| 2019/0212908 A1 | 7/2019 | Willcox | |

FOREIGN PATENT DOCUMENTS

| | | |
|---|---|---|
| EP | 3155584 | 4/2017 |
| EP | 3210386 | 8/2017 |
| GB | 2561458 | 10/2018 |
| JP | 2010191533 | 9/2010 |
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |
| WO | 2015148738 | 10/2015 |
| WO | 2015195492 | 12/2015 |
| WO | 2016064827 | 4/2016 |
| WO | 2017004475 | 1/2017 |
| WO | 2018006065 | 1/2018 |
| WO | 2018094105 | 5/2018 |

OTHER PUBLICATIONS

Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.

Beni; "From Swarm Intelligence to Swarm Robotics"; Swarm Robotics WS 2004, LNCS 3342; pp. 1-9; 2005.

Cuthbertson; "Oscar Predictions: AI Calculates Leonardo DiCaprio Will Finally Get His Oscar"; Newsweek Tech & Science; http://

(56) References Cited

OTHER PUBLICATIONS www.newsweek.com/oscar-predictions-artificial-intelligence-predicts-leo-will-finally-get-his-430712; Feb. 26, 2016; 3 pages.

Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.

Deck et al; "Prediction Markets in the Laboratory"; University of Arkansas and Chapman University; J. Econ. Surv., 2013; 33 pages.

Deneubourg et al; "Collective Patterns and Decision-Making"; Ethology Ecology & Evolution; Mar. 22, 1989; pp. 295-311.

Ding et al; "Time Weight Collaborative Filtering"; CIKM'05, Oct. 31-Nov. 5, 2005; Bremen, Germany; pp. 485-492.

EP; Extended European Search Report for EP Application No. 15767909.3 mailed from the European Patent Office dated Sep. 4, 2017.

EP; Extended European Search Report for EP Application No. 15808982.1 mailed from the European Patent Office dated Nov. 28, 2017.

EP; Extended European Search Report for EP Application No. 15852495.9 mailed from the European Patent Office dated Mar. 21, 2018.

Gauchou et al; "Expression of Nonconscious Knowledge via Ideomotor Actions"; Consciousness and Cognition; Jul. 28, 2011; 9 pages.

Green; "Testing and Quantifying Collective Intelligence"; Collective Intelligence 2015; May 31, 2015; 4 pages.

Hanson et al; "Information Aggregation and Manipulation in an Experimental Marke"; Interdisciplinary Center for Economic Science, George Mason University; Jul. 12, 2005; 15 pages.

Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.

International Search Report and Written Opinion of the International Searching Authority for PCT/US2015/022594 dated Jun. 29, 2015.

Malone et al; "Harnessing Crowds: Mapping the Genome of Collective Intelligence"; MIT Center for Collective Intelligence; Feb. 2009; 20 pages.

Meyer; "Meet Loomio, The Small-Scale Decision-Making Platform With the Biggest Ambitions"; Mar. 13, 2014; https://gigaom.com/2014/03/13/meet-loomio-the-small-scale-decision-making-platform-wi . . . ; downloaded Mar. 25, 2015; 11 pages.

PCT; International Search Report and Written Opinion of the International Searching Authority for PCT/US2015/035694 dated Aug. 28, 2015.

PCT; International Search Report and Written Opinion of the International Searching Authority for PCT/US2015/56394 dated Feb. 4, 2016.

PCT; International Search Report and Written Opinion of the International Searching Authority for PCT/US2016/040600 dated Nov. 29, 2016.

PCT; International Search Report and Written Opinion of the International Searching Authority for PCT/US2017/040480 dated Oct. 23, 2017.

PCT; International Search Report and Written Opinion of the International Searching Authority for PCT/US2017/062095 dated May 23, 2018.

Rand et al; "Dynamic Social Networks Promote Cooperation in Experiments with Humans"; PNAS; Nov. 29, 2011; vol. 108, No. 48; pp. 19193-19198.

Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.

Rosenberg et al; "Amplifying Prediction Accuracy Using Swarm A. I."; Intelligent Systems Conference 2017; Sep. 7, 2017; 5 pages.

Rosenberg et al; "Crowds vs. Swarms, A Comparison of Intelligence"; IEEE; Oct. 21, 2016; 4 pages.

Rosenberg; "Artificial Swarm Intelligence vs. Human Experts"; Neural Networks (IJCNN); 2016 International Joint Conference on IEEE; Jul. 24, 2016; 5 pages.

Rosenberg; "Artificial Swarm Intelligence, a human-in-the-loop approach to A. I."; Association for the Advancement of Artificial Intelligence; Feb. 12, 2016; 2 pages.

Rosenberg; "Human Swarming, a real-time method for Parallel Distributed Intelligence"; Proceedings of IEEE, 2015 Swarm/Human Blended Intelligence; Sep. 28, 2015; 7 pages.

Rosenberg; "Human Swarms, A Real-Time Method for Collective Intelligence"; Proceedings of the European Conference on Artificial Life 2015; Jul. 20, 2015; pp. 658-659.

Rosenberg; "Human Swarms, a real-time method for collective intelligence"; Proceedings of the European Conference on Artificial Life. 2015; pp. 658-659.

Rosenberg; "Monkey Room Book One"; Outland Pictures; Amazon ebook; Jan. 15, 2014; 39 pages.

Rosenberg; "Monkey Room Book Three"; Outland Pictures; Amazon ebook; Feb. 20, 2014; 22 pages.

Rosenberg; "Monkey Room Book Two"; Outland Pictures; Amazon ebook; Feb. 9, 2014; 27 pages.

Rosenberg; "Monkey Room"; Outland Pictures; Amazon; Mar. 30, 2014; 110 pages.

Rosenberg; "New Hope for Humans in an A. I. World"; TEDxKC—You Tube; Sep. 7, 2017; http://www.youtube.com/watch?v=Eu-RyZT_Uas.

Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1, 2016.
Rosenberg; U.S. Appl. No. 15/241,340, filed Aug. 19, 2016.
Rosenberg; U.S. Appl. No. 15/640,145, filed Jun. 30, 2017.
Rosenberg; U.S. Appl. No. 15/898,468, filed Feb. 17, 2018.
Rosenberg; U.S. Appl. No. 15/904,239, filed Feb. 23, 2018.
Rosenberg; U.S. Appl. No. 15/910,934, filed Mar. 2, 2018.
Rosenberg; U.S. Appl. No. 15/922,453, filed Mar. 15, 2018.
Rosenberg; U.S. Appl. No. 15/936,324, filed Mar. 26, 2018.
Rosenberg; U.S. Appl. No. 16/059,698, filed Aug. 9, 2018.
Rosenberg; U.S. Appl. No. 16/356,777, filed Mar. 18, 2019.
Rosenberg: U.S. Appl. No. 15/959,080, filed Apr. 20, 2018.

Salminen; "Collective Intelligence in Humans: A Literature Review"; Lappeenranta University of Technology, Lahti School of Innovation; 1Proceedings; 2012; 8 pages.

Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.

Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.

Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.

Unanimous A. I.; "What is Swarm Intelligence"; 2015; http://unu.ai/swarm-intelligence/; downloaded Oct. 6, 2016; 3 pages.

USPTO; Examiner Interview Summary for U.S. Appl. No. 15/086,034 dated Feb. 13, 2019.

USPTO; Examiner Interview Summary for U.S. Appl. No. 15/086,034 dated Jan. 9, 2019.

USPTO; Final Office Action for U.S. Appl. No. 14/925,837 dated Aug. 7, 2019.

USPTO; Final Office Action for U.S. Appl. No. 15/086,034 dated Jul. 17, 2018.

(56) References Cited

OTHER PUBLICATIONS

USPTO; Non-Final Office Action for U.S. Appl. No. 14/738,768 dated Sep. 8, 2017.
USPTO; Non-Final Office Action for U.S. Appl. No. 15/047,522 dated Jan. 5, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.
USPTO; Non-Final Office Action for U.S. Appl. No. 14/920,819 dated Jun. 27, 2018.
USPTO; Non-Final Office Action for U.S. Appl. No. 14/925,837 dated Apr. 3, 2018.
USPTO; Non-Final Office Action for U.S. Appl. No. 15/017,424 dated Apr. 2, 2019.
USPTO; Non-Final Office Action for U.S. Appl. No. 15/052,876 dated Feb. 22, 2018.
USPTO; Non-Final Office Action for U.S. Appl. No. 15/086,034 dated Feb. 2, 2018.
USPTO; Non-Final Office Action for U.S. Appl. No. 15/199,990 dated Sep. 25, 2019.
USPTO; Non-Final Office Action for U.S. Appl. No. 15/241,340 dated Jul. 19, 2018.
USPTO; Non-Final Office Action for U.S. Appl. No. 15/910,934 dated Oct. 16, 2019.
USPTO; Non-Final Office Action for U.S. Appl. No. 15/959,080 dated Nov. 7, 2019.
USPTO; Non-Final Office Action for U.S. Appl. No. 16/668,970 dated Aug. 15, 2017.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
USPTO; Notice of Allowance for U.S. Appl. No. 14/859,035 dated Aug. 23, 2018.
USPTO; Notice of Allowance for U.S. Appl. No. 14/920,819 dated Dec. 27, 2018.
USPTO; Notice of Allowance for U.S. Appl. No. 14/925,837 dated Nov. 7, 2019.
USPTO; Notice of Allowance for U.S. Appl. No. 15/047,522 dated Aug. 30, 2018.
USPTO; Notice of Allowance for U.S. Appl. No. 15/052,876 dated Aug. 13, 2018.
USPTO; Notice of Allowance for U.S. Appl. No. 15/086,034 dated Mar. 5, 2019.
USPTO; Notice of Allowance for U.S. Appl. No. 15/241,340 dated Nov. 20, 2018.
USPTO; Notice of Allowance for U.S. Appl. No. 15/640,145 dated May 23, 2019.
USPTO; Notice of Allowance for U.S. Appl. No. 15/640,145 dated Nov. 15, 2018.
USPTO; Notice of Allowance for U.S. Appl. No. 15/815,579 dated Jul. 31, 2019.
USPTO; Notice of Allowance for U.S. Appl. No. 16/904,239 dated Jun. 17, 2019.
USPTO; Office Action for U.S. Appl. No. 14/708,038 dated Apr. 23, 2019.
USPTO; Restriction Requirement for U.S. Appl. No. 15/199,990 dated Aug. 1, 2019.
Wikipedia; "Swarm (simulation)", Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
Yeung et al.; "Metacognition in human decision-making: confidence and error monitoring"; Philosophical Transactions of the Royal Society B; 2012; pp. 1310-1321.
USPTO; Non-Final Office Action for U.S. Appl. No. 15/936,324 dated Oct. 21, 2019.

* cited by examiner

DYNAMIC SYSTEMS FOR OPTIMIZATION OF REAL-TIME COLLABORATIVE INTELLIGENCE

This application is a continuation of U.S. application Ser. No. 15/052,876 entitled DYNAMIC SYSTEMS FOR OPTIMIZATION OF REAL-TIME COLLABORATIVE INTELLIGENCE filed Feb. 25, 2016, which claims the benefit of U.S. Provisional Application No. 62/120,618 entitled APPLICATION OF DYNAMIC RESTORING FORCES TO OPTIMIZE GROUP INTELLIGENCE IN REAL-TIME SOCIAL SWARMS, filed Feb. 25, 2015, both of which are incorporated in their entirety herein by reference.

This application is a continuation-in-part of U.S. application Ser. No. 15/959,080 entitled METHODS AND SYSTEMS FOR GAZE ENABLED COLLABORATIVE INTELLIGENCE, filed Apr. 20, 2018, which in turn is a continuation of U.S. application Ser. No. 15/936,324 entitled METHODS AND SYSTEMS FOR REAL-TIME CLOSED-LOOP COLLABORATIVE INTELLIGENCE, filed Mar. 26, 2018, which in turn is a continuation of U.S. application Ser. No. 14/668,970 entitled METHODS AND SYSTEMS FOR REAL-TIME CLOSED-LOOP COLLABORATIVE INTELLIGENCE, filed Mar. 25, 2015, now U.S. Pat. No. 9,959,028 issued May 1, 2018, which in turns claims the benefit of U.S. Provisional Application 61/970,885 entitled METHOD AND SYSTEM FOR ENABLING A GROUPWISE COLLABORATIVE CONSCIOUSNESS, filed Mar. 26, 2014, all of which are incorporated in their entirety herein by reference.

This application is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turns claims the benefit of U.S. Provisional Application 61/991,505 entitled METHODS AND SYSTEM FOR MULTI-TIER COLLABORATIVE INTELLIGENCE, filed May 10, 2014, both of which are incorporated in their entirety herein by reference.

This application is a continuation-in-part of U.S. application Ser. No. 15/910,934 entitled INTUITIVE INTERFACES FOR REAL-TIME COLLABORATIVE INTELLIGENCE, filed Mar. 2, 2018, which in turn is a continuation of U.S. application Ser. No. 14/738,768 entitled INTUITIVE INTERFACES FOR REAL-TIME COLLABORATIVE INTELLIGENCE, filed Jun. 12, 2015, now U.S. Pat. No. 9,940,006 issued Apr. 10, 2018, which in turns claims the benefit of U.S. Provisional Application 62/012,403 entitled INTUITIVE INTERFACE FOR REAL-TIME COLLABORATIVE CONTROL, filed Jun. 15, 2014, all of which are incorporated in their entirety herein by reference.

This application is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015 which in turns claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, both of which are incorporated in their entirety herein by reference.

This application is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015 which in turns claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014.

This application is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015 which in turns claims the benefit of U.S. Provisional Application No. 62/069,360 entitled SYSTEMS AND METHODS FOR ENABLING AND MODERATING A MASSIVELY-PARALLEL REAL-TIME SYNCHRONOUS COLLABORATIVE SUPER-INTELLIGENCE, filed Oct. 28, 2014.

This application is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016 which in turns claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, both of which are incorporated in their entirety herein by reference.

This application is a continuation-in-part of U.S. application Ser. No. 15/047,522 entitled SYSTEMS AND METHODS FOR COLLABORATIVE SYNCHRONOUS IMAGE SELECTION, filed Feb. 18, 2016 which in turns claims the benefit of U.S. Provisional Application No. 62/117,808 entitled SYSTEM AND METHODS FOR COLLABORATIVE SYNCHRONOUS IMAGE SELECTION, filed Feb. 18, 2015, both of which are incorporated in their entirety herein by reference.

This application is a continuation-in-part of International Application No. PCT/US15/22594, filed Mar. 25, 2015.

This application is a continuation-in-part of International Application No. PCT/US15/35694, filed Jun. 12, 2015.

This application is a continuation-in-part of International Application No. PCT/US15/56394, filed Oct. 20, 2015.

BACKGROUND OF THE INVENTION

1. Field of the Invention

The present invention relates generally to systems and methods for collaborative intelligence, and more specifically to systems and methods for closed-loop, dynamic collaborative intelligence.

2. Discussion of the Related Art

Portable computing devices, such as cell phones, personal digital assistants, and portable media players have become popular personal devices due to their highly portable nature, their ability to provide accessibility to a large library of stored media files, their interconnectivity with existing computer networks, and their ability to pass information to other portable computing devices and/or to centralized servers through phone networks, wireless networks and/or through local spontaneous networks such as Bluetooth® networks. Many of these devices also provide the ability to store and display media, such as songs, videos, podcasts, ebooks, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to have a real-time group-wise experience that evokes the group's collaborative intent and intelligence (Collaborative Consciousness). Hence, there is a substantial need to provide tools and methods by which groups of individuals, each having a portable computing device upon their person, to more easily contribute their personal will/intent to an emerging collaborative consciousness, allowing the group to collectively answer questions or otherwise express their group-wise will in real-time. Furthermore, there is a need to provide tools and methods that enable groups of users to be informed of the group-wise will that is emerging in real-time. The present invention, as described herein, addresses these and other deficiencies present in the art.

SUMMARY OF THE INVENTION

Several embodiments of the invention advantageously address the needs above as well as other needs by providing a real-time collaborative control system for a group of users in real-time collaborative control of at least one graphical object, comprising: a group of a plurality of computing devices, each user of the group associated with one of the plurality of computing devices, each computing device comprising a communications infrastructure coupled to each of a processor, a memory, and a display interface coupled to a display and configured to receive input from a user; a collaborative intent application stored on each memory and configured to run on each processor to: convey to the user, using the display interface, a group collaboration opportunity, receive, repeatedly in real-time, user input of a user intent vector having a direction and a magnitude through the display interface, send, repeatedly in real-time, the user intent vector to a collaboration server, receive, repeatedly in real-time, a group intent vector from the collaboration server, and present, repeatedly in real-time, the graphical object at a location on the display, wherein the location is based at least in part on the group intent vector; and the collaboration server in networked communication with the plurality of computing devices, the collaboration server including a server processor and a server memory, the server processor configured to run a collaboration mediation application stored on the server memory, the collaboration mediation application configured run on the server processor to: convey to the user, using the display interface, the group collaboration opportunity, receive, repeatedly in real-time, the user intent vectors, determine, repeatedly in real-time, a group force value from the user intent vectors, determine, repeatedly in real-time, a bias restoring force vector having a restoring force magnitude and a restoring force direction, the restoring force magnitude being a percentage of the group force value, determine, repeatedly in real-time, the group intent vector from the user intent vectors and the bias restoring force vector; sending, repeatedly in real-time, the group intent vector to the plurality of computing devices, whereby a closed-loop system is formed between the collaboration server and the plurality of computing devices.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
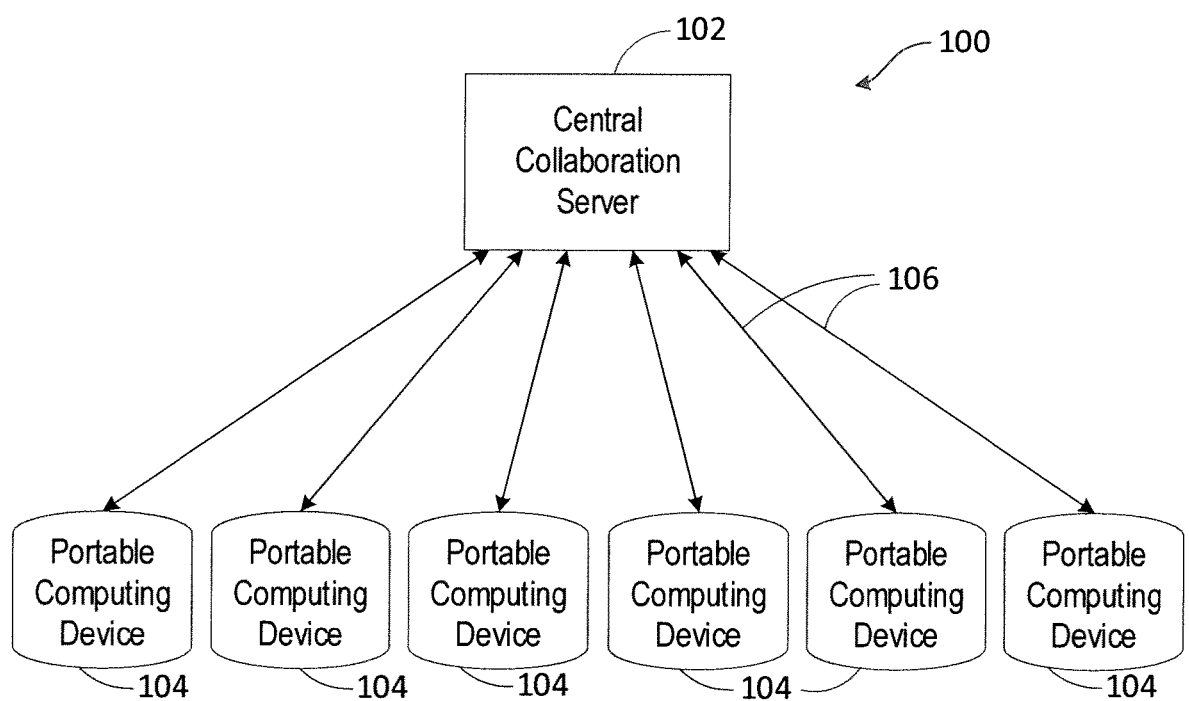
FIG. 1 is a schematic diagram of an exemplary real-time collaborative system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Real-time occurrences as referenced herein are those that are substantially current within the context of human perception and reaction, i.e. approximately within the perceptual limits of human cognition.

Prior systems for supporting networked collaboration have been developed, but are asynchronous in nature, letting users provide isolated input, sequentially, the results generated by simple votes, ratings, and/or polling. For example, the present inventor was awarded U.S. Pat. No. 8,745,104 entitled "COLLABORATIVE REJECTION OF MEDIA FOR PHYSICAL ESTABLISHMENTS" that describes a novel system for allowing groups of users to reject the media playing in a restaurant or other public venue through sequential polling. While effective for its desired purpose, such systems do not foster a true collaborative intelligence among groups of users. One reason that traditional polls and surveys fail to facilitate collaborative intelligence is that there is no real-time negotiation, users instead imparting "fire and forget" votes or ratings such that collaborators can't explore the options in real-time and converge on common ground. What is needed is a real-time closed loop system and supporting methods that enables groups of networked users to function is a singular synchronous entity—a "social swarm" that can make decision, take actions, or answer questions.

For example, the asynchronous nature of polls and surveys, as used by tools such as Reddit®, Yelp®, and Digg® cause distorted results. This is because the first few individuals to give a vote or rating have a disproportionate impact on the final output. The process is called "herding" or "snowballing" and reflects the fact that voters in asynchronous rating systems are deeply influenced by the votes that precede their own. In a recent study performed by researchers at MIT and Hebrew University of Jerusalem (Muchnik et al.; Science Vol. 341, Aug. 9, 2013), it was found that a single up-vote inserted as the first response on a forum like Reddit, can boost the likelihood of future positive ratings by an average of 32% and can distort the outcome by 25%. The researchers warn that these herding effects are distorting our perceived views on everything from product recommendations on Amazon to electoral polling and market predictions.

To avoid the pitfalls of asynchronous polling and enable a true real-time collaborative intelligence, the present inventor has advanced computer mediated collaboration, transforming the process from the collection of isolated asynchronous input to more sophisticated closed-loop systems that engender real-time synchronous collaboration. What is further needed, however, are systems and methods that enable groups to select an image or a portion of an image through real-time synchronous collaboration. The present invention discloses such systems and methods, including novel systems and methods for placing a graphical pin (or other locative identifier) on an image in a location that is selected collaboratively by a real-time synchronous group of users. In some such embodiments, the image on which a graphical pin is placed is a map, a calendar, or a group of visually separable sub-images (for example images of a set of products, logos, foods, or faces). The present invention discloses novel systems and methods for zooming an image collaboratively by a real-time synchronous group of users.

Also disclosed herein is a new type of swarm replay wherein a group intent vector is shown as a directional arrow across a plurality of time-steps, enabling enhanced visualization of the decision.

The inventive systems and methods that enable a real-time, synchronous, Collaborative Intelligence that can generate and select from among a plurality of suggestions through a computer-moderated multi-round iterative process. The present invention builds upon methods and systems disclosed in prior co-pending applications by the present inventor and hereby incorporated by reference.

As described in related patent application Ser. Nos. 14/668,970, 14/708,038, 14/738,768 and 14/859,035 by the present inventor, all of which are incorporated by reference, an innovative real-time system has been developed that enables synchronous groups of users to form a coherent swarm intelligence that can collaboratively control a graphical element such as a pointer (or "puck") in order to collectively answer questions, make statements, take actions, select functions, or otherwise respond to prompts. Using the disclosed systems and methods, a "social swarming" platform is enabled that allows users to join one of a plurality of hosted swarms, collaborate with that swarm, earn scores and/or credits and/or rankings based on their performance with respect to others in the swarm, and browse the stored output from other swarms. In some embodiments, groups (i.e. swarms) can compete with other swarms, each of said swarms also earning group-wise scores, credits, and/or rankings with respect to other swarms.

The collaboration system has been developed that allows the group of users to collaboratively control a graphical pointer 210 in order to collaboratively answer questions or otherwise respond to prompts. In one embodiment, each individual user ("participant") engages the user interface on a computing device 104, conveying his or her individual real-time will in response to a prompt such as a textually displayed (or audibly displayed) question as well as in response to real-time feedback provided to the user of the group's emerging real-time intent. This closes the loop around each user, for he is conveying individual intent while also reacting to the group's emerging intent. Thus each user must be able to see not only the prompt that begins a session, but the real-time group intent as it is forming. For example, if the intent is being conveyed as words, the user will see those words form, letter by letter. If the intent is being conveyed as a direction, the user sees the direction form, degree by degree. If the intent is being conveyed as a choice among objects, the user sees the graphical pointer 210 get closer and closer to a particular chosen object. Thus, the user is seeing the group's will emerge before his eyes, reacting to that will in real-time, and thus contributing to it. This closes the loop, not just around one user, but around all users who have a similar experience on their own individual computing device 104 at substantially the same time. While the embodiments described generally refer to portable computing devices, it will be understood that non-portable computing devices, such as desktop computers, may also be used.

Using the disclosed systems and methods, a "social swarming" platform is enabled that allows users to join one of a plurality of hosted groups (also referred to as swarms), each group comprising a plurality of users. The user may collaborate with that group, earn scores and/or credits and/or rankings based on his performance with respect to others in the group, and browse the stored output from other groups. In some embodiments, groups can compete with other groups, each of said groups also earning group scores, credits, and/or rankings with respect to other groups.

As described in co-pending U.S. patent application Ser. No. 14/668,970 entitled METHODS AND SYSTEMS FOR REAL-TIME CLOSED-LOOP COLLABORATIVE INTELLIGENCE, by the present inventor, which is hereby incorporated by reference, systems and methods have been developed that allow a group of users to collaboratively control the motion of a graphical pointer through a unique group-wise control paradigm. In some embodiments, the collaboratively controlled pointer is configured to allow a group of users to choose letters, words, and/or numbers in response to a prompt posed to the group. This enables the formation a group response that's not based on the will of any individual user, but rather based on the collective will of the group. In some embodiments, the group response comprises a set of letters, numbers, and/or words that form a textual reply to a question or statement posed to the group. In this way, the system disclosed herein enables a group of people to verbally communicate as a single collective intelligence. In some embodiments, the group response may comprise a task performed in response to a prompt, for example the collaborative control of the pointer to draw a picture as a group. We refer to such a collective intelligence herein as a "swarm A.I." for it's an artificial intellect that emerges from the group as a result of unique computer-moderated methods employed herein.

As described in co-pending U.S. patent application Ser. No. 14/708,038 entitled MULTI-GROUP METHODS AND SYSTEMS FOR REAL-TIME MULTI-TIER COLLABORATIVE INTELLIGENCE by the current inventor, which is hereby incorporated by reference, additional systems and methods were disclosed that encourage groups of real-time users who are collaboratively answering questions by controlling the pointer, to produce coherent responses while discouraging incoherent responses. A number of methods were disclosed therein, including (a) coherence Scoring, (b) coherence feedback, and (c) tiered processing. These and other techniques greatly enhance the effectiveness of group-wise collaborative control, incentivizing participants to convey their individual will in a more collaborative and coherent manner. By promoting greater collaboration among members of a real-time group, the result a more focused "swarm intelligence" that produces more coherent answers in shorter amounts of time.

As described in co-pending Provisional patent application Ser. No. 14/738,768, entitled INTUITIVE INTERFACES FOR REAL-TIME COLLABORATIVE INTELLIGENCE, by the current inventor, which is hereby incorporated by reference, systems and additional novel methods were disclosed that provide additional novel systems and methods for user interfacing that make group-wise collaborative control more intuitive for the participating users. More specifically, novel systems and methods were disclosed that enable individual users to intuitively impart their own personal intent upon the graphical pointer that's being collaboratively controlled through real-time synchronous input collected from a plurality of users. Some disclosed embodiments support users interfacing with a mouse, touchpad, trackball, or touchscreen. Other embodiments support users interfacing by tilting a mobile computing device such as a phone or tablet. Some preferred methods employ a manipulatable graphical magnet such that each user positions the magnet so as to impart a simulated pull on the group-wise pointer. The sum (or average) of the plurality of user's individual pulls are then used to influence the group-wise motion of the pointer, thus providing a physically intuitive control paradigm. This and other novel solutions disclosed therein, solved the unique problems posed by enabling real-time synchronous collaborative control of the group-wise pointer, thus enabling more effective "swarm intelligence" systems.

Also disclosed were methods and systems to enable individual users to quickly and easily pose questions to a collaborating group. As described in the co-pending applications, moderating software can be configured to orchestrate which users can ask questions to the group and when. Once a question is asked, it can be answered through collaborative control methods in which the pointer is enabled to select one of a predefined set of input choices displayed (such as YES, NO, MAYBE, PROBABLY, DOUBTFUL) and/or by selecting one of a set of alphanumeric characters. While such methods are highly effective, additional methods were disclosed herein that also allows individuals to specify a set of custom choices (i.e. possible answers) when asking a question to the group. The custom choices are then displayed graphically to the group as spatially arranged elements. The users can then collaboratively select among the spatially arranged elements using the group-wise pointer. This allows for "bounded-set questions" to be asked in a fast and fun manner, making the overall user experience far more enjoyable and efficient.

Also disclosed were innovative hosting methods, allowing large numbers of users to login and participate in collaborative experiences. More specifically, a novel paradigm was disclosed that allows groups of users to enter one of a plurality of on online collaboration groups (referred to herein as swarms) and participate in question/answer sessions. Users can choose among the plurality of swarms, some being public (for groups of strangers), other being private (for groups of friends). The swarms can be general or themed, such that themed swarms are for questions on a particular topic. In some embodiments, swarms can compete with other swarms, bringing the real-time synchronous methods disclosed herein to a higher order, creating a group comprised of groups (i.e. a swarm of swarms). Also disclosed were methods of giving swarms their own unique voice by enabling answers produced by synchronous groups of users to be Tweeted® (via Twitter®). This technology is the first known deployment of Tweets from a consciousness comprised not of a single individual, but a swarm of individuals acting as emergent artificial intelligence.

As described in co-pending U.S. patent application Ser. No. 14/859,035, entitled SYSTEMS AND METHODS FOR ASSESSMENT AND OPTIMIZATION OF REAL-TIME COLLABORATIVE INTELLIGENCE SYSTEMS by the present inventor, and hereby incorporated by reference, systems and additional novel methods were disclosed that enhance collaborative group decisions and actions. As disclosed, each swarm can be configured to dynamically adjust its configuration by adjusting the relative weighting of the input received from members of the swarm. More specifically, in some embodiments, algorithms are used to increase the impact (weighting) that some users have upon the collective pull of the pointer, while decreasing the impact (weighting that other users have upon the collective pull of the pointer. More specifically, user synchrony values (also called user synchronicity values) are computed to reflect each user's contribution to (or resistance of) an emerging consensus in each trial. Users who show a time history of high "sync", have their weighting values increased by the underlying software, while users who show a time history of low "sync" have their weighting values decrease. In this way, the swarm intelligence is adapted over time by the underlying algorithms disclosed herein, strengthening the connections (i.e. input) with respect to the more collaborative users, and weakening the connections with respect to the less collaborative users. In this way, the collaborative swarm in controlled in a manner innovatively reminiscent of an adaptable neural network that optimizes its intelligence over time Also disclosed in Ser. No. 14/859,035 are methods for enabling members of a swarm to ask a question to the group and then collect suggestions populate the possible answers from other members of the swarm. The group then collectively selects upon the options submitted. This technique is referred to herein as "suggestion mode" and can be viewed as an enhanced version of the "custom mode" disclosed in co-pending U.S. patent application Ser. No. 14/738,768. In the custom mode, a user can ask a question and provide a set of answers that the swarm will choose from. In suggestion mode, the user asks a question by indicates that the custom choices are to be collected from any members of the swarm who have ideas for options (i.e. suggestions) to populate the choices. When a suggestion mode question is asked by a member of the swarm, all other members of the swarm are alerted with a pop-up window that asks them for suggestions. A "suggestion timer" is optionally employed, giving the group a fixed time-window to provide suggestions. For example 30 seconds. The system may be configured such that if a minimum of 2 suggestions are not contributed within the 30 second window, the question is terminated. After all, you need at least two choices or the swarm has nothing to do. Conversely, if a full set of suggestions is received before the 30 second time limit is up, the question immediately begins, the group moving the pointer to choose among the suggestions that populated the board. In the event that more suggestions are made than fit on the target area, the first suggestions received from users are used by the software. Conversely, users with higher scores, ratings, sync values, or credit values, may be assigned priority making suggestions.

This method is highly effective, for it allows a swarm to engage in a two-step question and answer process. For example, a swarm might comprise of a small group of friends. One user asks the group a question, entering it into the question box—"What movie should we see tonight?" The user selects suggestion mode. Immediately, that question appears on the screens of all the other users. Also appearing on their screens is a suggestion dialog box, asking them to provide suggestions and giving a time limit (for example, 30 seconds, counting down with a timer). As users enter suggestions, they appear around the target board. In addition, the chat window indicates the name of the user who made each suggestion. When the time is up, or when a full set of suggestions are received, the software starts the answer phase of the session, giving the users collaborative control over the puck. The users then collaboratively move the puck (using the real-time methods disclosed) to one of the choices. That choice is then sent to all members.

Finally, referring again to the Ser. No. 14/859,035 application, a gravity mode was disclosed in which the puck 210 experiences a restoring force that pulls it to a point substantially centered among a plurality of the given choices, the restoring force is a function of distance from the center. This creates a dynamic in which the collaborative swarm must pull on the puck 210 with a collective force that overcomes gravity in order to position the puck 210 on one of the plurality of target choices 208. This alters the decision dynamics of the swarm. For example, assuming the swarm has split into two factions, each faction pulling for one of two different answers to the question—without gravity, a simple majority of users is all that's needed in order for the swarm to pull on the puck 210 in a substantially synchronized manner in order to position the puck 210 on a given answer. Thus, without gravity, if there were 100 users, with 51 pulling towards one answer, and 49 pulling towards another, the 51 would likely be able to position the puck 210 on the desired answer choice 208. But with gravity of sufficient restoring force, the system can be configured to require that a larger majority of users is needed to achieve consensus on one of the two choices being vied for. In an example embodiment, the force of gravitational restoring force is sized such that 80% (i.e. 80 users) are needed to pull in a substantially similar direction to overcome gravity (and the 20% of users opposing) and position the puck 210 on the desired answer. This mode thus enables a higher barrier for collaborative decision making, forcing the group to have more "conviction" in the resulting response in order for consensus to be reached. Thus a simulated gravitational restoring force can be selectively introduced by in an inventive manner to increase the threshold for collaborative decision making, and can be sized in magnitude to avoid decisions resulting from random fluctuations in the preference distribution of the users in the swarm. Note—the example embodiment disclosed employs a novel "inverse gravity" profile such that the gravitational restoring force increases with distance from a central origin. This creates a dynamic where the puck 210 is very easy to move away from the center, but faces growing resistance, pulling back towards center, as the puck 210 nears the answer choices 208.

Such gravitational methods are further explored herein (along with other restoring forces). In addition, an alternate use of gravitational restoring force is disclosed herein to combat the possibility of decision biases based on the spatial layout of options in the target board. As will be explained herein, low-levels of gravity (or other restoring force configurations) can be applied to mitigate positional biases.

Also, inventive methods are disclosed herein that size the restoring force that mitigates positional biases based on the number of factions the swarm is split into, a faction being a sub-group of the swarm that is pulling towards the same desired choice. We call such a desired choice a "preferred option" and thus each faction is pulling towards a different preferred option. In some embodiments, the restoring force that mitigates positional bias is based at least in part on the number on the number of factions.

And finally, inventive methods for "smart gravity" are disclosed herein such that the gravitational force is not only scaled based on displacement from an origin, but also scaled based on real-time forces that are applied by the users in the swarm. More specifically, the gravitational force is scaled based on the scalar sum of the forces applied by the users such that a higher scalar sum (i.e. sum of the absolute value of the user force vectors), the greater the gravitational restoring force. This allows for gravity to kick in when it is needed, and fade out when it is not. For example, when the swarm is applying no force to the puck, or substantially low force, this method applies no restoring force, or substantially small restoring force. Conversely, when the users are all or mostly applying individual forces, the scalar sum is at or near the maximum possibly produced by the swarm. This corresponds to a maximum possible gravitational restoring force, further scaled by the distance from the defined origin, the greater the distance the higher the restoring force. This allows gravity to kick in when it's most needed, to either (1) avoid decisions being made based on insignificant variations in user preference, or (2) avoid decisions being made based on positional biasing effects. This will be described in detail herein.

Referring first to FIG. 1, a schematic diagram of an exemplary collaboration system 100 is shown. Shown are a Central Collaboration Server (CCS) 102, the plurality of portable computing devices 104, and a plurality of exchanges of data with the Central Collaboration Server 106.

Embodiments of the plurality of portable computing devices 104 and the interaction of the computing devices 104 with the system 100 are previously disclosed in the related patent applications.

As shown in FIG. 1, the system 100 comprises the Central Collaboration Server (CCS) 102 in communication with the plurality of computing devices 104, each of said computing devices 104 running a Collaborative Intent Application ("CIA"). The system 100 is designed to enable the plurality of users, each engaging an interface of one of said computing devices 104, to jointly control a single graphical element, for example the movable pointer 210, through real-time group-wise collaboration. In some embodiments, such as a multi-tier architecture, the portable computing devices 104 may communicate with each other. The CCS 102 includes software and additional elements as necessary to perform the required functions. In this application, it will be understood that the term "CCS" may be used to refer to the software of the CCS 102 or other elements of the CCS 102 that are performing the given function.

Although multiple pointers controlled by multiple swarms is enabled by the innovations of the present invention, for the current discussion we will give examples that are confined to a single swarm. This is for simplicity of description and is not intended to limit the scope of the innovations.

Referring again to FIG. 1, each of the computing devices 104 comprises one or more processors capable of running the CIA routines and displaying a representation of the pointer 210 along with the plurality of graphical answer choices 208. The computing device 104 could be, for example, a personal computer running the CIA application. It could also be a mobile device such as a smart phone, tablet, headset, smart-watch, or other portable computing device running the CIA. The CIA software code can be configured as a stand-alone executable or be code that executes inside a web-browser or other shell.

While FIG. 1 shows only six computing devices 104 in communication with the CCS 102, the system 100 is highly scalable, enabling hundreds, thousands, or even millions of users to connect simultaneously to the CCS 102, each using their own computing device 104, thereby sharing a real-time collaborative experience with the other users. In this way, large numbers of users can collaboratively control the pointer 210 to generate a response by selecting letters, words, or numbers as a group intelligence.

While FIG. 1 shows simple top-down architecture for direct communication between the CCS 102 and each of the computing devices 104, related application Ser. No. 14/708,038 entitled MULTI-GROUP METHODS AND SYSTEMS FOR REAL-TIME MULTI-TIER COLLABORATIVE INTELLIGENCE discloses multi-group and tiered architectures that enable shared processing loads among large numbers of computing devices 104. While FIG. 1 shows a dedicated CCS 102, the system 100 can be configured such that one of the computing devices 104 acts as the CCS 102 by running both CCS routines and CIA routines. Such a model is generally viable only when the number of users is low. Regardless of the architecture used, each of said computing devices 104 that is engaged by a participating user includes one or more display devices for presenting a graphical user interface to the user.

Figure 2:
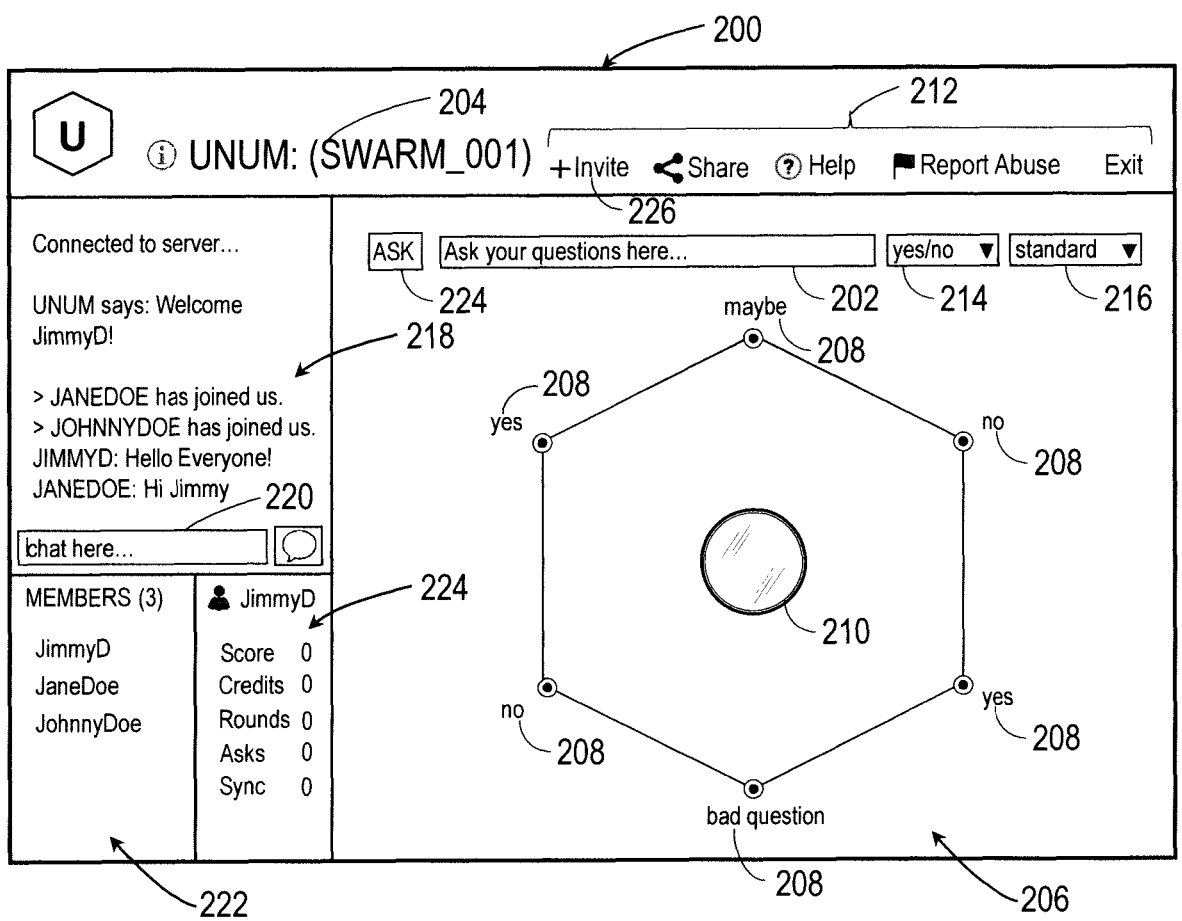
FIG. 2 is a view of an exemplary display interface of a computing device of the collaborative system in accordance with one embodiment of the present invention.

Referring next to FIG. 2, an exemplary display interface 200 is shown in accordance with one embodiment of the present invention. Shown are a prompt bar 202, a group name 204, a target area 206, the plurality of answer choices 208, the pointer 210, a communication menu 212, a board selection drop-down menu 214, a physics selection drop-down menu 216, the chat window 218, a chat input box 220, a current member list 222, a statistics display 224, an invite button 226, and an ask button 228.

The graphical pointer 210 is simultaneously displayed to each user by the CIA running on his computing device 104. The pointer 210 displayed to each user appears in a substantially similar position with respect to the set of answer choices 208 (as compared to the position of the pointer 210 on other user's screens). The synchrony of the interfaces is coordinated by the data 106 received by each computing device 104 sent from the CCS 102 over the communications link. In a current embodiment, data 106 is sent from the CCS 102 to each of the plurality of computing devices 104 at a rate of 60 updates per second, the data 106 including the current position of the graphical pointer 210 (also referred to as a puck) with respect to the set of graphical answer choices 208, as further shown below.

In general, the answer choices 208 (also referred to as input choices) are identically displayed upon all the computing devices 104, although some unique embodiments allow for divergent answer choices 208. For example, in some embodiments the answer choices 208 are displayed in the native language of each user, each answer choice 208 conveying a substantially similar verbal message, but translated based on a language setting of the user. This feature enables swarms of individuals who may speak different languages and may be unable to communicate directly, to still form a swarm intelligence that can collaboratively answer questions or take actions. In such embodiments, the displayed questions are also automatically translated into the chosen native language of the user. This is also true of a displayed answer, and optionally the chat window 218 output.

In some embodiments, multiple graphical pointers 210 are displayed by the computing devices 104, each of said graphical pointers 210 being collaboratively controlled by a different group of users. For example, 500 users may be collaboratively controlling Graphical Pointer #1, while a different group of 500 users are collaboratively controlling Graphical Pointer #2. The first group of 500 users comprises a first swarm. The second group of 500 users comprises a second swarm. This unique system and methods allow for the first swarm to compete with the second swarm in a task that is displayed simultaneously to all 1000 users on each of their computing devices 104.

As shown in FIG. 2, the CIA software running on each computing device 104 is configured to display a graphical display interface 200 that includes at least one graphical pointer 210 and the plurality of spatially arranged graphical answer choices 208. In the example shown, the graphical pointer 210 is configured to look like a "glass puck" with a central viewing area that is transparent. In the example shown, the answer choices 208 are configured as a hexagon of six answer choices 208, each answer choice 208 including a graphical icon (in the embodiment shown, a dot inside a circle) and an associated word. In this case, the six answer choices 208 correspond with possible answers to questions: "Yes", "Maybe", "No", "Yes", "Bad Question", and "No". When the pointer 210 is positioned over one of the answer choices 208 such that the answer choice 208 is substantially within a centralized viewing area of the pointer 210 for more than a threshold amount of time, that answer choice 208 is selected as a target. In common embodiments the threshold amount of time is 3 to 5 seconds. In the current embodiment, the centralized viewing area appears as a graphical etching on the glass pointer 210, the etching remaining invisible until the pointer 210 approaches a target.

As shown in the exemplary embodiment of FIG. 2, the spatially arranged graphical answer choices 208 can comprise letters, numbers, words, and/or punctuation marks. The answer choices 208 could also comprise photographs. In this example, if the pointer 210 is positioned over one of the six targets for more than the threshold amount of time, that answer choice 208 is selected as the answer to a previously asked question.

To ask a question, the user enters the question into the prompt bar 202. Once entered, the user clicks the ask button 228, which sends the question from the CIA software of that particular user (running on his computing device 104) to the CCS 102. Because many users could ask questions, the CCS 102 acts as the gate keeper, deeming the first question received (when no question is currently in process) as the one that will be asked to the group. In the current embodiment, not all users are enabled to ask questions at any given time to avoid too much competition for asking. In some embodiments, credits are redeemable by the user for the right to ask the question. In some embodiments, the user must spend credits to ask the question, and can only ask if he has enough credits. In some embodiments, users earn credits based on points awarded for participation in a session. More credits are awarded to users who have high sync scores, less credits being awarded to users with low sync scores.

In addition to asking questions, users can select from a plurality of possible target areas by using the board selection drop-down menu 214. The currently selected target area 206 is for yes/no questions. Other target areas may include true/false questions, good/bad questions, and other sets of standardized answers. Also, a spelling board may be included where a full alphabet of answer choices 208 are displayed, allowing users to spell out answers (as shown in co-pending applications). The spelling board may also include numbers, punctuation, backspace, blank space, and other alphanumeric characters.

As disclosed in co-pending applications, custom boards can also be entered by selecting "custom" from the board selection drop-down menu 214. As will be disclosed further below, "suggestion mode" can also be selected for a given question through the board selection drop-down menu 214.

As also shown in FIG. 2, users can selectively use a physics mode from the physics selection drop-down menu 216. As shown, a standard physics mode has been selected, but users can choose ice mode where the pointer 210 slides around on the target area 206 as if it were frictionless ice. A gravity mode is configured to pull the pointer 210 back to a location substantially near a center of the answer choice set (i.e. center screen) as if by simulated gravity. In a heavy mode the pointer 210 has substantially higher mass than in standard mode and thus is harder for users to collectively move. In a barrier mode, a set of physical barriers block a direct path to the answer choices 208, forcing users to collaboratively guide the pointer 210 around barriers to reach the answer choices 208.

As also shown in FIG. 2, the display interface 200 includes the chat window 218 that allows users to exchange messages by typing in the chat input box 220. Also included is the list of current members who are part of the group and thus enabled to ask questions and collaboratively provide control over the pointer 210.

Because users enter this group display interface 200 from a lobby display interface where the user can choose from among a plurality of available groups or swarms, the name of the current group (swarm) is also displayed. In addition, users can invite their friends to this group by clicking on the invite button 226 includes in the communication menu 212. In the current embodiments, these invites can leverage existing social networks such as Facebook® friends and Twitter® followers. Also included in the interface of the current embodiment is the statistics display 224 that gives the user of this instance of the software (on this computing device 104) a listing of his personal statistics including his score, credits, synchronicity value, the number of rounds he has participated in, and the number of questions he has asked the swarm.

When an exemplary question is entered by one of the users in the group, the question is sent by the CIA on that user's computing device 104 to the CCS 102. If the CCS 102 software determines that the question is valid, the question is then sent to all the users in the group so that it appears substantially simultaneously on the display interface of each of the computing devices 104. In a current embodiment, the question appears in a large box at the top of the target area 206. Then a "3"-"2"-"1" countdown timer appears at the center of the target area 206, notifying users get ready for the collaborative answer process, or session, to begin. The display interface (having received instructions from the CCS 102) then displays a graphical "GO" and the users will then collaboratively control the motion of the pointer 210, guiding it towards whichever answer choice 208 best satisfies the collaborative will of the group as emergent from the real-time swarm intelligence.

Each answer session is generally limited in total time by the underlying software of the present system 100, for example giving the swarm 60 seconds to converge upon an answer through the collaborative motion of the pointer 210. This time pressure is deliberate, for it inspires users to employ their gut instincts and intuitions rather than over-thinking the question.

To support the use of time-pressure, the countdown clock 304 is displayed on a group display interface 300 of each user (as shown below in FIG. 3), the timing of the plurality of countdown clocks 304 coordinated by handshaking signals from the CCS 102. If the pointer 210 does not reach the target within the allotted 60 seconds, the system 100 determines that the collaboration is a failure, and sends a failure indication to the CIA of each computing device 104. In some embodiments, in response to receiving the failure indication the CIA terminating user input and displaying the words "brain freeze!" on the group interface. In addition, in response to receiving the failure indication all users could lose a number of points and/or credits for the collective failure of the group to guide the pointer 210 to a target.

Figure 4:
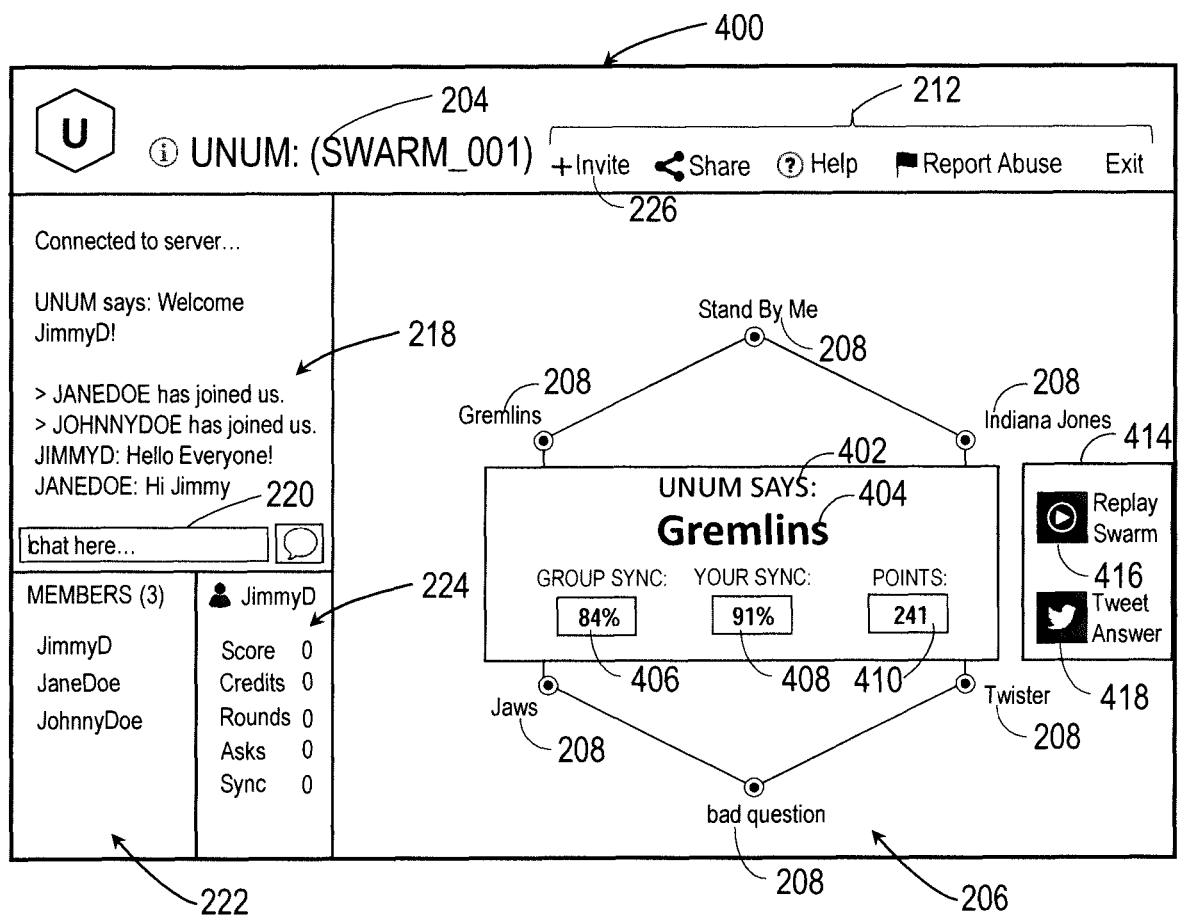
FIG. 4 is a view of an exemplary group display interface of the computing device of the collaborative system after the collaboration session has been successfully completed.

The system 100 is configured to determine that a target is achieved when the group successfully positions the pointer 210 over one answer choice 208 for more than the threshold period of time. When the group targets one answer choice 208, the target is displayed on the CIA screens of all the users as the answer to the question. Also displayed may be statistics for that answer as shown below in FIG. 4, such as the group cohesiveness score and the user synchronicity value, as previously described in related application Ser. No. 14/708,038. Also displayed may be points and/or credits awarded for the current user's participation in the emergent answer, as shown in FIG. 4.

Figure 3:
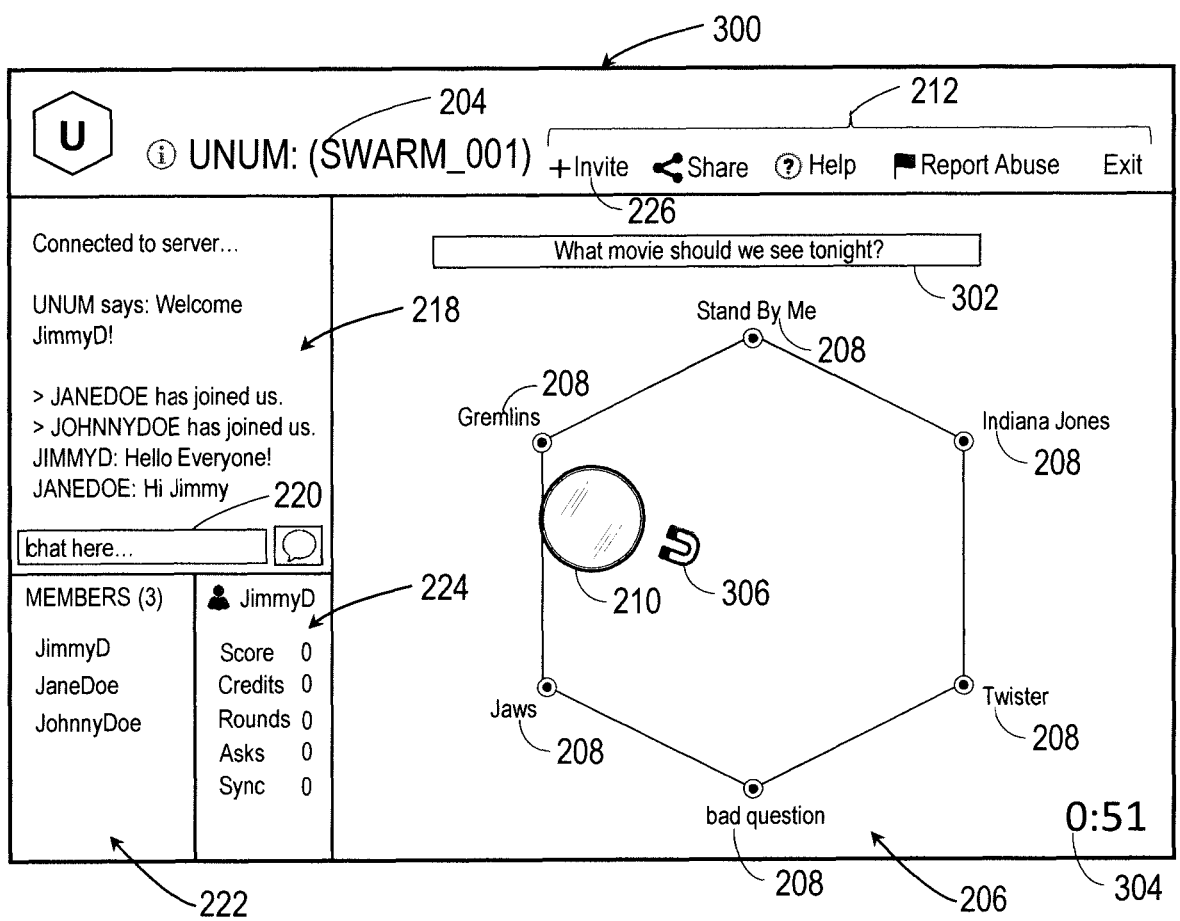
FIG. 3 is a view of an exemplary group display interface of the computing device of the collaborative system at a point in time during a collaboration session.

Referring next to FIG. 3, shown is the exemplary group display interface 300 of one user at a point in time during a collaboration session, i.e. after the question has been received by the computing devices 104 but before the collaboration session has ended. Shown are the group name 204, the target area 206, the plurality of answer choices 208, the pointer 210, the communication menu 212, the chat window 218, the chat input box 220, the current member list 222, the statistics display 224, the invite button 226, a question display 302, a countdown clock 304, and a magnet icon 306.

As shown in FIG. 3, the basic layout of the display interface 300 is similar to FIG. 2. In FIG. 3, in the target area 206 the prompt bar 202, the ask button 228, the board selection drop-down menu 214, and the physics selection drop-down menu 216 have been replaced by the question display 302. The question display 302 appears substantially simultaneously upon the screens of the computers of all users in the swarm. Also displayed on the target area 206 are the set of answer choices 208 from which the users are being asked to collaboratively select from. In this case the question is—"What movie should we see tonight?" and the answer choices 208 include five movie names: "Jaws", "Gremlins", "Stand By Me", "Indiana Jones", and "Twister" along with a sixth answer choice 208, "Bad Question". In many embodiments, the Bad Question choice is automatically included in the answer choices 208 by the CCS 102, allowing the swarm to collectively reject the question. This allows the group not to waste time on incoherent or undesirable questions.

After the question and answer choices 208 appear on the display interfaces of the group members, the "3"-"2"-"1" countdown timer appears (not shown) to signal the start of the current session. When the session begins, the users are now enabled to provide user input to the pointer 210, guiding it towards one of the answer choices 208. As the session time progresses, the 60 second countdown clock 304 counts down, applying time pressure to the group. In FIG. 3, the countdown clock 304 is shown at 0:51, indicating that 51 seconds remain in the current session. During the current session, group members may also be inputting messages via text using the chat window 218, and/or may be chatting with a simultaneously enabled group voice chat. This allows interpersonal communication during the session.

As disclosed in the co-pending applications which have been incorporated by reference, each user is enabled to apply forces upon the pointer 210 to convey his individual intent as to how the pointer 210 should move at any moment in time. The displayed motion of the pointer 210, however, is not a reflection of that user's individual input but a reflection of the collectively combined group input from the entire swarm of users. As disclosed in co-pending applications, the collective input from the plurality of users can be such that each user's input imparts an equally weighted contribution to the total force applied to the pointer 210. In some embodiments, weighting factors are used to give the input force from some users a higher contribution as compared to other users. As will be described later in this document, novel methods of adjusting the weighting factors have been developed such that computational configuration of swarms can be dynamically changed over time by the underlying software running on the CCS 102, optimizing the collaborative performance of a given group based on the historical performance of its members.

As disclosed in the co-pending applications which have been incorporated by reference, each user is enabled to apply forces upon the pointer 210 using one of a variety of innovative methods. In one preferred embodiment, disclosed in application Ser. No. 14/738,768, each user controls the graphical magnet icon 306 by manipulating a mouse, touchpad, touchscreen, tilt interface, or other provided userinterface method. In one such embodiment, as the user moves his mouse cursor within a threshold distance of the pointer 210, it turns into the magnet icon 306 that grows larger in size, the closer to the pointer 210 the mouse is positioned. The larger size indicates a larger force. The relative position of the magnet icon 306, which always orients itself towards a center of the pointer 210 under software control, indicates the direction of pull that user wants to impart on the pointer 210. In this way, a user can intuitively impart of force of a selectable magnitude and direction upon the pointer 210.

In other embodiments, the user can tilt the portable computing device 104 to convey a desired magnitude and direction. In such embodiments, the magnet icon 306 or other graphical indicator is displayed to indicate the imparted force. In some such embodiments, the user must also tap the screen while tilting the computing device 104, the frequency of the taps causing a higher force to be applied. This unique use of a combined tilt and tap methodology is highly effective, for it enables one handed input from users on small mobile devices. It also enables the ease of tilting, but avoids it feeling too passive by also requiring frequent tapping. In many such embodiments, the maximum force is applied for only a short time following each tap (for example 0.5 seconds) and then fades away over a subsequent period of time (for example 3 to 5 seconds). The displayed magnet icon 306 shrinks and fades away along with the force magnitude. This is a highly intuitive interface and requires that a user repeatedly tap to maintain a maximally applied force upon the pointer 210. This is an innovative implementation, for it has been found that requiring frequent tapping better engages the user in the collaborative experience when the tilt interface is used.

In other embodiments the user is enabled to swipe across a touchscreen display to indicate the magnitude and direction of the force the user desires to apply to the pointer 210. In many such embodiments the magnet icon 306 is displayed, indicative of the magnitude and direction conveyed by the swipe. In such embodiments, the swipe force is applied for only a short time (for example 0.5 seconds) and then fades away over a period of time (for example 3 to 5 seconds). The magnet shrinks and fades away along with the force magnitude. This is a highly intuitive interface and requires that the user repeatedly swipe the screen to maintain a maximally applied force upon the pointer 210. This is an innovative implementation, for requiring frequent and repeated swipes better engages the user in the collaborative experience when the swipe interface is used.

As disclosed in the co-pending applications, the CCS 102 software collects input from the plurality of users, computes a resultant motion of the pointer 210, and communicates the resultant motion of the pointer 210 to each CIA of the plurality of computing devices 104. The CCS 102 software also determines if the pointer 210 location is successfully targeting one answer choice 208 for more than the threshold amount of time. If so, the CCS 102 software determines that the question is answered and communicates the targeted answer choice 208 to all members of the group such that it is substantially simultaneously displayed upon the display interface of each computing device 104 included in the group.

In this way, the system 100 of the present invention enables groups of networked users to collaboratively control the graphical pointer 210 in response to one or more questions posed by members of group. More specifically, embodiments of the current system 100 enable each of the plurality of users to view on a screen of their own individual computing devices 104, a representation of the pointer 210 and the target area 206, and enable each of said users to convey the user intent (also referred to as the user intent value) as to the desired direction (and optionally magnitude) of motion that user wants the pointer 210 to move so as to select one of the answer choices 208 displayed on the target area 206. The user intent is represented as a user intent vector. The user intent vector can be conveyed by the user, for example, by tilting his computing device 104 in the desired direction, swiping the screen in a desired direction, or positioning the mouse such that the graphical magnet icon 306 pulls on the pointer 210 with a desired direction.

In some embodiments, eye tracking hardware and software are included in the computing device 104, for example the eye tracking hardware and software disclosed in U.S. Pat. No. 7,429,108 to the present inventor. The CIA is configured to operate the eye tracking hardware and software and receive input from the eye tracking hardware are software. In the current innovation, a user's gaze is tracked by the CIA and used to compute the user intent vector that represents the user's desired motion of the pointer 210, which is communicated to the CCS 102 software. More specifically, the user's gaze defines a location with respect to the pointer 210. The vector between the location and the center of the pointer 210 is then used by the CIA to compute the magnitude and direction of the user intent vector. In this way, the user can simply look towards a direction that he desires the pointer 210 to move, and the user intent vector is computed by the CIA and sent to the CCS 102 software by the CIA. In some instances the magnet icon 306 or other graphical element is displayed to represent the user intent vector on the display. In this way, the user can participate in the collaborative swarm intelligence experience using a hands-free method.

In some embodiments, a brain-computer interface (sometimes called a mind-machine interface, direct neural interface, synthetic telepathy interface, or a brain-machine interface), is employed to collect the user input of one or more users in the swarm. In some such embodiments, the user's brain-waves are detected by the brain-computer interface as he or she watches the pointer 210 move upon his screen. A calibration session is often required to correlate detected brain activity with a desired direction of motion of the pointer 210, but once that calibration is complete, the brain-computer interface system can be used by the CIA to compute the user intent vector that represents that user's desired motion of the pointer 210 at each time-step during the session, this user intent vector being communicated to the CCS 102 software. In this way, the user can simply think about a direction that he desires the pointer 210 to move, and the user intent vector is computed and sent to the CCS 102 software by the CIA. In some instances the magnet icon 306 or other graphical element is displayed to represent the user intent vector on the screen of the user's computing device 104. In this way, the user can participate in the collaborative swarm intelligence using a hands-free method.

Whatever the input method used (mouse, touchscreen, tilt, eye-tracking, or brain-tracking), the system 100 is configured such that the user intent vector is communicated by the CIA, running on the user's computing device 104, to the Central Collaboration (CCS) 102. The CCS 102 collects the user intent vectors from the plurality of users (via their separate computing devices 104), and then derives a group intent vector that represents the collective will of the group at that time. The group intent vector is then used to compute an updated location of the pointer 210 with respect to the target area 206 and the answer choices 208, the updated location reflecting the collective will of the group.

In many preferred embodiments, a physical model is employed in which the pointer 210 is assigned a simulated mass and damping, each user input represented as a simulated force vector. In some such embodiments, the mass and damping of the pointer 210 is adjusted dynamically by the software depending upon a physics mode selected by the user who asks each question by using the physics selection drop-down menu 216 shown in FIG. 2. In some such embodiments, the ice mode can be selected by the user in which the pointer 210 glides very freely as if on ice. In some such embodiments, the heavy mode can be selected by the user in which the pointer 210 requires the collaborative pull of a large majority of members of the swarm to achieve any real velocity. In some embodiments, the mass and damping are dynamically assigned by the software on the CCS 102 depending upon the current size of the swarm, the larger the swarm the higher the mass and higher the damping assigned.

Whether a physics model is used or not, the updated pointer 210 location is then sent by the CCS 102 to each of the computing devices 104 and is used by the CIA running on each of said computing devices 104 to update the displayed location of the pointer 210. In this way, the plurality of users can watch the pointer 210 move, not based on their own individual input, but based on the overall collective intent of the group.

As described in related U.S. patent application Ser. No. 14/668,970, the group intent vector can be computed from the plurality of user intent vectors as a simple average, or may be computed as a weighted average in which some users have more influence on the resulting collective group intent than other users. In such embodiments, the weighting of each user can be derived based on user scores and/or user synchronicity values (also referred to as synchrony values or performance values) earned during prior interactions with the system 100. In such embodiments, each user may be assigned one or more variables that represents how his or her input should be weighted with respect to other users in the swarm. In some embodiments the variable is called the user contribution index and is updated regularly to reflect the skill of that user in providing input that helps the group reach a coherent collaborative response. The user who demonstrates a history of "constructive input" (i.e. input that is supportive of the collective intent, will be assigned a higher user contribution index than the user who has demonstrated a history of "destructive input" (i.e. input that is substantially resistant to the collective intent). In this way, users are incentivized push for collaborative consensus.

Those users who are supportive to the emerging consensus are determined computationally by the CCS 102 by repeatedly comparing each user's user intent vector with the group intent vector. The more aligned that user's user intent vector is with the direction of the group intent vector, the more collaborative that user is behaving. The further the user intent vector is from the direction of the group intent vector, the less collaborative the user is behaving. This level of collaboration is represented by the value defined herein and in the related applications as the user's synchrony (or synchronicity). The synchronicity value may be an instant synchronicity value, i.e. one at a certain instant in time, or may be a session synchronicity value representing the overall user synchronicity for one or more sessions.

The synchronicity value for each individual user is determined by the CCS 102 by repeatedly comparing the user intent received from each computing device 104 (representing the user input reflecting the user's intent to move the graphical object of the pointer 210 in a given direction) with the group intent derived from all user intents. The synchronicity value of the individual user is determined but computing the difference between the user intent and the group intent. The synchronicity value may be an instant value, i.e., based on a single comparison of the user intent to the group intent at one point in time, or may be synchronicity value over a specific period of time, e.g. an average of the synchronicity values over that period. Thereby, the user synchronicity value each individual user represents at least in part that user's contribution to the collaborative control of the at least one graphical object.

In some embodiments, each individual's synchrony value ranges between an upper bound value and a lower bound value. In one embodiment, the synchronicity value ranges between +1 to −1, with the value +1 (the upper bound) being assigned when the user intent vector is substantially aligned with the group intent vector, and with the value of −1 (the lower bound) being assigned when the user intent vector is substantially in the opposite direction of the group intent vector, with all values between +1 and −1 being used to represent varying degrees of alignment. For example, if the user intent vector is 90 degrees out phase with the group intent vector, a value of 0 is assigned, for that is halfway between fully convergent and fully divergent. Thus, a skilled user is one who is able to convey his individual intent as input, but do so in a cooperative manner. Such a user will maintain a positive synchrony value during much of the session, for he or she is being supportive of the group intent. A user who maintains a positive value will be awarded more points and be assigned a higher user contribution index than a user who does not.

In some embodiments, the user's synchronicity values are computed as a percentage from 0% to 100%, for that is often an easier metric for users to understand. The session synchronicity value of 100% means the user has been perfectly in sync with the swarm. The session synchronicity value of 0% means the user has been entirely out of sync with the swarm. Session synchronicity values between 0% and 100% reflect relative synchronization with the swarm, with a 50% synchronicity value meaning the user was neutral with respect to the swarm. This is described in more detail later in this document.

In some embodiments, an average (or mean) synchronicity value is computed for the user over some number of prior questions. For example a "sync 5" synchronicity value can be computed as that user's average synchronicity value (also referred to as the average performance value) over the last five sessions. This is a highly useful value for it indicates how cooperative the user has been over a recent period of time. The "sync 5" synchronicity value can be used in combination with other time-histories, such as a "sync 50" synchronicity value which indicates the average synchronicity value for that user over the last 50 sessions, in order to compute that user's weighting value in the swarm. In some embodiments, the mean synchronicity value may be time-weighted such that time steps near the end of the session time period are more heavily weighted than time steps near the start of the time period.

In some embodiments, the CCS 102 determines at least one user assessment based at least in part upon one of more user synchronicity values. For examples, one assessment may be configured to determine whether the user is categorized as "flexible" or "entrenched". In another example, one assessment may be configured to determine whether the user is "constructive" or "destructive".

Referring next to FIG. 4, shown is an exemplary display interface 400 as displayed on the computing device 104 being used by one user of a group, shown at a moment in time after the group has successfully positioned the pointer 210 on one of the answer choices 208, selecting the answer choice 208 as the target, thereby collaboratively choosing the answer. Shown are the group name 204, the target area 206, the plurality of answer choices 208, the communication menu 212, the chat window 218, the chat input box 220, the current member list 222, the statistics display 224, the invite button 226, a prefix text 402, a target text 404, a group cohesiveness score indication 406, a session synchronicity value score indication 408, a points indication 410, an answer window 412, an answer options tab 414, a replay swarm icon 416, and a Tweet answer icon 418.

In this instance, the target is "Gremlins", reflecting the swarm's collaborative will in response to the posed question: "What movie should we see tonight?" As shown in FIG. 4, the target is graphically displayed to each user on the screen of his or her computing device 104 (as controlled by the CIA software running on that device 104). In the embodiment shown, the graphical display includes the answer window 412 including the prefix text 402 "UNUM says:" along with the chosen target: "Gremlins".

In some embodiments, the answer is also displayed in the chat window 218, as if communicated by the personified entity "UNUM" itself. This gives the swarm intelligence a feeling of personality and presence.

Also displayed in the answer window 412 is one or more statistics computed by the CCS 102 software. The statistics may reflect the performance of the group as a whole or reflect the performance of the particular user of that computing device 104. In this example, the group cohesiveness score indication 406, reflecting the synchronicity of the group, is shown of 84%, which indicates that the group was 84% aligned in their imparted motion of the pointer 210. The group cohesiveness score indication 406 includes the text "GROUP SYNC:" The group cohesiveness score of 84% shows strong convergence of group members, reflecting that the swarm intelligence spoke with high "conviction" when answering this question. A low group cohesiveness score would reflect a low conviction for the swarm intelligence. In some embodiments the group cohesiveness score may be repeatedly reported to and repeatedly displayed by each of the computing devices 104, for example during the session.

Related application Ser. No. 14/708,038 discloses some methods of computing the group cohesiveness score, such as to compute a running average of the absolute value (i.e. magnitude) of the group intent vector over time.

The group cohesiveness score may have an upper bound and a lower bound, wherein a group cohesiveness score at the upper bound indicates that the plurality of real-time user intents are substantially aligned with each other, and a group cohesiveness score at the lower bound indicates that the plurality of real-time user intent values are substantially misaligned with each other. In one embodiment, the lower bound is essentially 0, as the summation of the user intent vectors, being opposite (exactly misaligned), cancel each other out.

In some embodiments, the CCS 102 determines at least one group assessment based at least in part upon one of more group cohesiveness scores. For examples, one assessment may be configured to determine whether the group is categorized as "flexible" or "entrenched".

The group cohesiveness score may be repeatedly calculated by the CCS 102 during the session and repeatedly received by each of the portable computing devices 104.

In another embodiment, the real-time user intent values are determined to be substantially aligned with each other (i.e. at or near the upper bound) when their vector directions are substantially the same in at least a plane. The real-time user intent values are determined to be substantially misaligned with each other (i.e. at or near the lower bound) when a summation of their vector directions substantially cancel each other out, resulting in a near zero resultant.

Also displayed in the answer window 412 is the session synchronicity value score indication 408. The session user synchronicity value is a statistical indication of how well the particular user of this computing device 104 was aligned in his input with the swarm as a whole. The session synchronicity value score indication 408 includes the text "YOUR SYNC:" and value of 91%. In this case, the user was very highly aligned, achieving a 91% synchronicity value.

Also displayed in the answer window 412 is the points indication 410, indicating the number of points earned by this user as a result of his or her participation during the session. The user in this session has earned 241 points, as shown in the points indication 410. The points indication 410 also includes the text "POINTS:"

Users earn more points (or credits) as a result of being constructively collaborative, helping the swarm reach a meaningful consensus. Users earn less points (credits) as a result of being non-collaborative (obstructive), blocking the swarm from finding a meaningful consensus. In the case where the swarm cannot answer a question within the allotted time because consensus is never reached, all users lose points (credits). This innovative scoring method encourages participants to be collaborative rather than obstructionist, thereby improving the performance of the swarm intelligence. This imposes a philosophical situation often referred to as a Prisoner's Dilemma and structures it uniquely such that group collaboration and consensus trumps group stagnation and entrenchment. In this way, the present invention helps groups to find common ground.

Also displayed is the answer options tab 414 which gives users options related to the answer that was just reached by the swarm. The user can selectively Tweet® the answer by selecting the Tweet answer icon 418. This triggers a routine within the CIA that sends a Tweet request to the CCS 102 software, which then sends an automated Tweet to Twitter. The Tweet includes the question and the selected answer. The Tweet also includes a numerical indication of the number of users who participated in answering the given question, thus conveying the size of the swarm intelligence which produced this Tweet. The Tweet also includes a hashtag, for example "# UNUMsays", as well as an indication of the group cohesiveness score. In this way, the swarm intelligence system comprised of dozens, hundreds, or even thousands of individual minds working as one can be given a unique voice as a social media entity. Enabling collaborative groups to ask questions, answer questions, and voice the swarm's collaborative intent over Twitter as a unique entity is highly unique and appealing to users. In some embodiments, the decision to Tweet an answer is posed by the software to the swarm. A question appears, e.g. "Should we tweet this?", and a set of answers appear "yes", "no", etc. If the group picks "yes" or an equivalent, the swarm intelligence has decided to send its own Tweet. In this way, the invention described herein enables the formation of a swarm intelligence, enables that swarm intelligence to answer questions, enables that swarm intelligence to consider the answer that emerges and decide if that swarm intelligence wants to Tweet the answer publically.

As also included in the answer options tab 414, each individual user can select a replay swarm icon 416. Upon selection of the replay swarm icon 416, the session resulting in the current answer is replayed on the display. The session replay is unique in that it displays an indication of the input of all users in the group at the same time (i.e. the swarm input), giving insight into how the swarm converged upon the collective answer. The video of the swarm input is displayed in high speed (generally 2× to 5× the speed of the real session). This saves time while also conveying a more intuitive display of swarm activity, for the high speed motion of the swarm input indicates the central tendencies more effectively than a real-time display.

Figure 5:
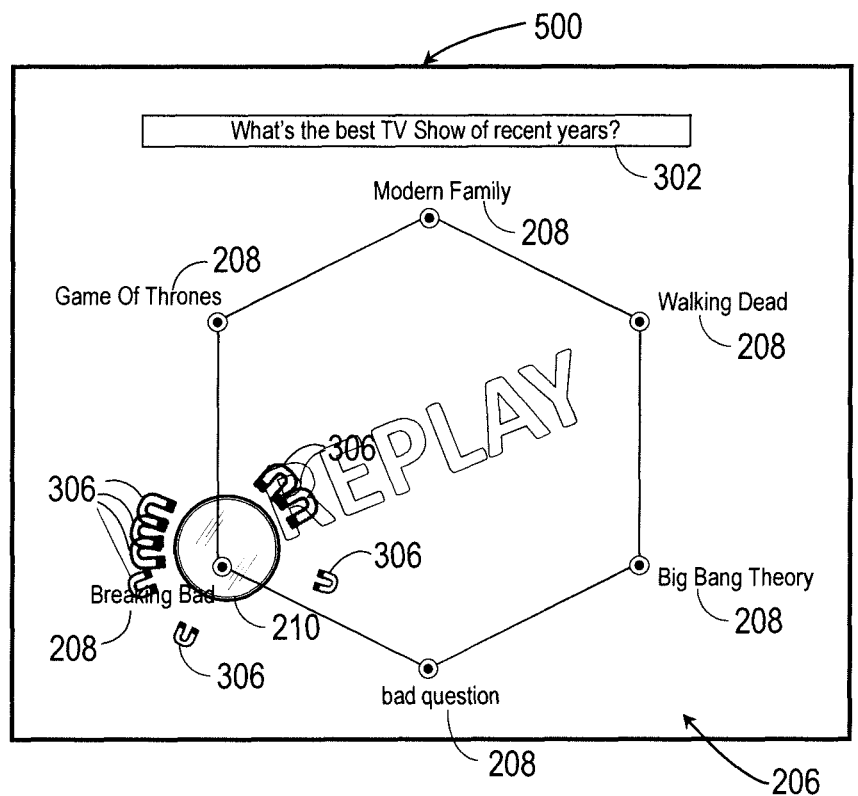
FIG. 5 is a view of a snapshot of an exemplary collaborative session replay video.

Referring next to FIG. 5, a snapshot of an exemplary session replay video 500 is shown. Shown are the target area 206, the plurality of input choices 208, the question display 302, the plurality of magnet icons 306, and the replay indication 502.

As shown in FIG. 5, the session replay video includes a representation of the question asked (the question display 302), the answer choices 208, and the graphical indication of the trajectory taken by the pointer 210 during the answer period. As FIG. 5 is a snapshot frame of the replay video, the pointer 210 is shown at a single location, but viewed over time the pointer 210 is shown moving across the target area 206. Also displayed is the graphical indication of the input provided by each user of the swarm at each time-step during the answer session. In this instance, the graphical magnet icon 306 is displayed for each user, the size and orientation of each magnet icon 306 with respect to the pointer 210 indicating the magnitude and direction of that user's user intent vector (magnitude and direction) upon the pointer 210 at each given moment in time. In this example, 8 users were participating in the swarm, collaboratively moving the pointer 210 to an answer. This method is scalable to much larger numbers of users. The target area may also include the replay indication 502 (the text "REPLAY" as shown in FIG. 5), indicating to the user that the session shown is a replay session and not a current session.

In some embodiments where hundreds or even thousands of users are participating at the same time, other innovative methods are employed to make the replay coherent. In one such embodiment, when the number of magnet icons 306 exceeds a threshold, they are grouped and averaged, for example showing one composite magnet icon 306 to represent every group of 10 in the swarm. In this way, a swarm with 800 users can be represented by a replay display of 80 magnet icons 306. This is highly informative to the user, conveying the central tendency of the swarm without overwhelming the display with too many magnet icons 306 (or other graphical indicators). In some embodiments, the user can select the replay speed.

Still, new methods and systems are needed to enhance synchronous collaborative decision making and bolster group intelligence. Herein, systems and methods that enable groups to select an image or a portion of an image through real-time synchronous collaboration. This includes novel systems and methods for placing a graphical pin (or other locative identifier) on an image in a location that is selected collaboratively by a real-time synchronous group. In some such embodiments, the image on which a graphical pin is placed is a map, a calendar, or a group of visually separable sub-images (for example images of a set of products, logos, foods, or faces). The present invention discloses novel systems and methods for zooming an image collaboratively by a real-time synchronous group of users.

Referring first to FIG. 1, a schematic diagram of an exemplary collaboration system 100 is shown. Shown are a Central Collaboration Server (CCS) 102, the plurality of portable computing devices 104, and a plurality of exchanges of data with the Central Collaboration Server 106.

Embodiments of the plurality of portable computing devices 104 and the interaction of the computing devices 104 with the system 100 are previously disclosed in the related patent applications.

As shown in FIG. 1, the system 100 comprises the Central Collaboration Server (CCS) 102 in communication with the plurality of computing devices 104, each of said computing devices 104 running a Collaborative Intent Application ("CIA"). The system 100 is designed to enable the plurality of users, each engaging an interface of one of said computing devices 104, to jointly control a single graphical element, for example the movable pointer 210, through real-time group-wise collaboration. In some embodiments, such as a multi-tier architecture, the portable computing devices 104 may communicate with each other. The CCS 102 includes software and additional elements as necessary to perform the required functions. In this application, it will be understood that the term "CCS" may be used to refer to the software of the CCS 102 or other elements of the CCS 102 that are performing the given function.

Although multiple pointers controlled by multiple swarms is enabled by the innovations of the present invention, for the current discussion we will give examples that are confined to a single swarm. This is for simplicity of description and is not intended to limit the scope of the innovations.

Referring again to FIG. 1, each of the computing devices 104 comprises one or more processors capable of running the CIA routines and displaying a representation of the pointer 210 along with a plurality of graphical input choices 208. The computing device 104 could be, for example, a personal computer running the CIA application. It could also be a mobile device such as a smart phone, tablet, headset, smart-watch, or other portable computing device running the CIA. The CIA software code can be configured as a stand-alone executable or be code that executes inside a web-browser or other shell.

While FIG. 1 shows only six computing devices 104 in communication with the CCS 102, the system 100 is highly scalable, enabling hundreds, thousands, or even millions of users to connect simultaneously to the CCS 102, each using their own computing device 104, thereby sharing a real-time collaborative experience with the other users. In this way, large numbers of users can collaboratively control the pointer 210 to generate a response by selecting letters, words, or numbers as a group intelligence.

While FIG. 1 shows simple top-down architecture for direct communication between the CCS 102 and each of the computing devices 104, related application Ser. No. 14/708,038 discloses multi-group and tiered architectures that enable shared processing loads among large numbers of computing devices 104. While FIG. 1 shows a dedicated CCS 102, the system 100 can be configured such that one of the computing devices 104 acts as the CCS 102 by running both CCS routines and CIA routines. Such a model is generally viable only when the number of users is low. Regardless of the architecture used, each of said computing devices 104 that is engaged by a participating user includes one or more display devices for presenting a graphical user interface to the user.

Referring next to FIG. 2, an exemplary display interface 200 is shown in accordance with one embodiment of the present invention. Shown are a prompt bar 202, a group name 204, a target area 206, a plurality of input choices 208, the pointer 210, a communication menu 212, a board selection drop-down menu 214, a physics selection drop-down menu 216, a chat window 218, a chat input box 220, a current member list 222, a statistics display 224, an invite button 226, and an ask button 228.

The graphical pointer 210 is simultaneously displayed to each user by the CIA running on his computing device 104. The pointer 210 displayed to each user appears in a substantially similar position with respect to a set of input choices 208 (as compared to the position of the pointer 210 on other user's screens). The synchrony of the interfaces is coordinated by the data 106 received by each computing device 104 sent from the CCS 102 over the communications link. In a current embodiment, data 106 is sent from the CCS 102 to each of the plurality of computing devices 104 at a rate of 60 updates per second, the data 106 including the current position of the graphical pointer 210 (also referred to as a puck) with respect to the set of graphical input choices 208, as further shown below.

In general, the input choices 208 are identically displayed upon all the computing devices 104, although some unique embodiments allow for divergent input choices 208. For example, in some embodiments the input choices 208 are displayed in the native language of each user, each input choice 208 conveying a substantially similar verbal message, but translated based on a language setting of the user. This feature enables swarms of individuals who may speak different languages and may be unable to communicate directly, to still form a swarm intelligence that can collaboratively answer questions or take actions. In such embodiments, the displayed questions are also automatically translated into the chosen native language of the user. This is also true of a displayed answer, and optionally the chat window 218 output.

In some embodiments, multiple graphical pointers 210 are displayed by the computing devices 104, each of said graphical pointers 210 being collaboratively controlled by a different group of users. For example, 500 users may be collaboratively controlling Graphical Pointer #1, while a different group of 500 users are collaboratively controlling Graphical Pointer #2. The first group of 500 users comprises a first swarm. The second group of 500 users comprises a second swarm. This unique system and methods allow for the first swarm to compete with the second swarm in a task that is displayed simultaneously to all 1000 users on each of their computing devices 104.

Although multiple pointers controlled by multiple swarms is enabled by the innovations of the present invention, for the current discussion we will give examples that are confined to a single swarm. This is for simplicity of description and is not intended to limit the scope of the innovations.

As shown in FIG. 2, the CIA software running on each computing device 104 is configured to display the graphical display interface 200 that includes at least one graphical pointer 210 and the plurality of spatially arranged graphical input choices 208. In the example shown, the graphical pointer 210 is configured to look like a "glass puck" with a central viewing area that is transparent. In the example shown, the input choices 208 are configured as a hexagon of six input choices 208, each input choice 208 including a graphical icon (in the embodiment shown, a dot inside a circle) and an associated word. In this case, the six input choices 208 correspond with possible answers to questions: "Yes", "Maybe", "No", "Yes", "Bad Question", and "No". When the pointer 210 is positioned over one of the input choices 208 such that the input choice 208 is substantially within a centralized viewing area of the pointer 210 for more than a threshold amount of time, that input choice 208 is selected as a target. In common embodiments the threshold amount of time is 3 to 5 seconds. In the current embodiment, the centralized viewing area appears as a graphical etching on the glass pointer 210, the etching remaining invisible until the pointer 210 approaches a target.

As shown in the exemplary embodiment of FIG. 2, the spatially arranged graphical input choices 208 can comprise letters, numbers, words, and/or punctuation marks. The input choices 208 could also comprise photographs. In this example, if the pointer 210 is positioned over one of the six targets for more than the threshold amount of time, that input choice 208 is selected as the answer to a previously asked question.

To ask a question, the user enters the question into the prompt bar 202. Once entered, the user clicks the ask button 228, which sends the question from the CIA software of that particular user (running on his computing device 104) to the CCS 102. Because many users could ask questions, the CCS 102 acts as the gate keeper, deeming the first question received (when no question is currently in process) as the one that will be asked to the group. In the current embodiment, not all users are enabled to ask questions at any given time to avoid too much competition for asking. In some embodiments, credits are redeemable by the user for the right to ask the question. In some embodiments, the user must spend credits to ask the question, and can only ask if he has enough credits. In some embodiments, users earn credits based on points awarded for participation in a session. More credits are awarded to users who have high sync scores, less credits being awarded to users with low sync scores.

In addition to asking questions, users can select from a plurality of possible target boards by using the board selection drop-down menu 214. The currently selected target board is for yes/no questions. Other target boards may include true/false questions, good/bad questions, and other sets of standardized answers. Also, a spelling board may be included where a full alphabet of input choices 208 are displayed, allowing users to spell out answers (as shown in co-pending applications). The spelling board may also include numbers, punctuation, backspace, blank space, and other alphanumeric characters.

As disclosed in co-pending applications, custom boards can also be entered by selecting "custom" from the board selection drop-down menu 214. As will be disclosed further below, "suggestion mode" can also be selected for a given question through the board selection drop-down menu 214.

As also shown in FIG. 2, users can selectively use a physics mode from the physics selection drop-down menu 216. As shown, a standard physics mode has been selected, but users can choose ice mode where the pointer 210 slides around on the target board as if it were frictionless ice. A gravity mode is configured to pull the pointer 210 back to a location substantially near a center of the input choice set (i.e. center screen) as if by simulated gravity. In a heavy mode the pointer 210 has substantially higher mass than in standard mode and thus is harder for users to collectively move. In a barrier mode, a set of physical barriers block a direct path to the input choices 208, forcing users to collaboratively guide the pointer 210 around barriers to reach the input choices 208.

As also shown in FIG. 2, the display interface 200 includes the chat window 218 that allows users to exchange messages by typing in the chat input box 220. Also included is the list of current members who are part of the group and thus enabled to ask questions and collaboratively provide control over the pointer 210.

Because users enter this group display interface 200 from a lobby display interface where the user can choose from among a plurality of available groups or swarms, the name of the current group (swarm) is also displayed. In addition, users can invite their friends to this group by clicking on the invite button 226 includes in the communication menu 212. In the current embodiments, these invites can leverage existing social networks such as Facebook® friends and Twitter® followers. Also included in the interface of the current embodiment is the statistics display 224 that gives the user of this instance of the software (on this computing device 104) a listing of his personal statistics including his score, credits, synchronicity value, the number of rounds he has participated in, and the number of questions he has asked the swarm.

When an exemplary question is entered by one of the users in the group, the question is sent by the CIA on that user's computing device 104 to the CCS 102. If the CCS 102 software determines that the question is valid, the question is then sent to all the users in the group so that it appears substantially simultaneously on the display interface of each of the computing devices 104. In a current embodiment, the question appears in a large box at the top of the target board. Then a "3"-"2"-"1" countdown timer appears at the center of the target board, notifying users get ready for the collaborative answer process, or session, to begin. The display interface (having received instructions from the CCS 102) then displays a graphical "GO" and the users will then collaboratively control the motion of the pointer 210, guiding it towards whichever input choice 208 best satisfies the collaborative will of the group as emergent from the real-time swarm intelligence.

Each answer session is generally limited in total time by the underlying software of the present system 100, for example giving the swarm 60 seconds to converge upon an answer through the collaborative motion of the pointer 210. This time pressure is deliberate, for it inspires users to employ their gut instincts and intuitions rather than over-thinking the question.

To support the use of time-pressure, the countdown clock 304 is displayed on a group display interface 300 of each user (as shown below in FIG. 3), the timing of the plurality of countdown clocks 304 coordinated by handshaking signals from the CCS 102. If the pointer 210 does not reach the target within the allotted 60 seconds, the system 100 determines that the collaboration is a failure, and sends a failure indication to the CIA of each computing device 104. In some embodiments, in response to receiving the failure indication the CIA terminating user input and displaying the words "Brain Freeze!" on the group interface. In addition, in response to receiving the failure indication all users could lose a number of points and/or credits for the collective failure of the group to guide the pointer 210 to a target. That said, most swarms are successful in guiding the puck to a target. The system 100 is configured to deem a target achieved when the group successfully positions the puck over a target for more than a threshold period of time. When collaboratively controlled targeting is achieved, the answer is displayed on the CIA screens of all the users. Also displayed are statistics for that answer—including the group sync, and that user's user sync. Also displayed are points and/or credits awarded for the current user's participation in the emergent answer.

Referring next to FIG. 3, shown is the exemplary group display interface 300 of one user at a point in time during a collaboration session, i.e. after the question has been received by the computing devices 104 but before the collaboration session has ended. Shown are the group name 204, the target area 206, the plurality of input choices 208, the pointer 210, the communication menu 212, the chat window 218, the chat input box 220, the current member list 222, the statistics display 224, the invite button 226, a question display 302, a countdown clock 304, and a magnet icon 306.

As shown in FIG. 3, the basic layout of the display interface 300 is similar to FIG. 2. In FIG. 3, in the target area 206 the prompt bar 202, the ask button 228, the board selection drop-down menu 214, and the physics selection drop-down menu 216 have been replaced by the question display 302. The question display 302 appears substantially simultaneously upon the screens of the computers of all users in the swarm. Also displayed on the target area 206 are the set of input choices 208 from which the users are being asked to collaboratively select from. In this case the question is—"What movie should we see tonight?" and the input choices 208 include five movie names: "Jaws", "Gremlins", "Stand By Me", "Indiana Jones", and "Twister" along with a sixth input choice 208, "Bad Question". In many embodiments, the Bad Question choice is automatically included in the input choices 208 by the CCS 102, allowing the swarm to collectively reject the question. This allows the group not to waste time on incoherent or undesirable questions.

After the question and input choices 208 appear on the display interfaces of the group members, the "3"–"2"–"1" countdown timer appears (not shown) to signal the start of the current session. When the session begins, the users are now enabled to provide user input to the pointer 210, guiding it towards one of the input choices 208. As the session time progresses, the 60 second countdown clock 304 counts down, applying time pressure to the group. In FIG. 3, the countdown clock 304 is shown at 0:51, indicating that 51 seconds remain in the current session. During the current session, group members may also be inputting messages via text using the chat window 218, and/or may be chatting with a simultaneously enabled group voice chat. This allows interpersonal communication during the session.

As disclosed in the co-pending applications which have been incorporated by reference, each user is enabled to apply forces upon the pointer 210 to convey his individual intent as to how the pointer 210 should move at any moment in time. The displayed motion of the pointer 210, however, is not a reflection of that user's individual input but a reflection of the collectively combined group input from the entire swarm of users. As disclosed in co-pending applications, the collective input from the plurality of users can be such that each user's input imparts an equally weighted contribution to the total force applied to the pointer 210. In some embodiments, weighting factors are used to give the input force from some users a higher contribution as compared to other users. As will be described later in this document, novel methods of adjusting the weighting factors have been developed such that computational configuration of swarms can be dynamically changed over time by the underlying software running on the CCS 102, optimizing the collaborative performance of a given group based on the historical performance of its members.

As disclosed in the co-pending applications which have been incorporated by reference, each user is enabled to apply forces upon the pointer 210 using one of a variety of innovative methods. In one preferred embodiment, disclosed in application Ser. No. 14/738,768, each user controls the graphical magnet icon 306 by manipulating a mouse, touchpad, touchscreen, tilt interface, or other provided user-interface method. In one such embodiment, as the user moves his mouse cursor within a threshold distance of the pointer 210, it turns into the magnet icon 306 that grows larger in size, the closer to the pointer 210 the mouse is positioned. The larger size indicates a larger force. The relative position of the magnet icon 306, which always orients itself towards a center of the pointer 210 under software control, indicates the direction of pull that user wants to impart on the pointer 210. In this way, a user can intuitively impart of force of a selectable magnitude and direction upon the pointer 210.

In other embodiments, the user can tilt the portable computing device 104 to convey a desired magnitude and direction. In such embodiments, the magnet icon 306 or other graphical indicator is displayed to indicate the imparted force. In some such embodiments, the user must also tap the screen while tilting the computing device 104, the frequency of the taps causing a higher force to be applied. This unique use of a combined tilt and tap methodology is highly effective, for it enables one handed input from users on small mobile devices. It also enables the ease of tilting, but avoids it feeling too passive by also requiring frequent tapping. In many such embodiments, the maximum force is applied for only a short time following each tap (for example 0.5 seconds) and then fades away over a subsequent period of time (for example 3 to 5 seconds). The displayed magnet icon 306 shrinks and fades away along with the force magnitude. This is a highly intuitive interface and requires that a user repeatedly tap to maintain a maximally applied force upon the pointer 210. This is an innovative implementation, for it has been found that requiring frequent tapping better engages the user in the collaborative experience when the tilt interface is used.

In other embodiments the user is enabled to swipe across a touchscreen display to indicate the magnitude and direction of the force the user desires to apply to the pointer 210. In many such embodiments the magnet icon 306 is displayed, indicative of the magnitude and direction conveyed by the swipe. In such embodiments, the swipe force is applied for only a short time (for example 0.5 seconds) and then fades away over a period of time (for example 3 to 5 seconds). The magnet shrinks and fades away along with the force magnitude. This is a highly intuitive interface and requires that the user repeatedly swipe the screen to maintain a maximally applied force upon the pointer 210. This is an innovative implementation, for requiring frequent and repeated swipes better engages the user in the collaborative experience when the swipe interface is used.

As disclosed in the co-pending applications, the CCS 102 software collects input from the plurality of users, computes a resultant motion of the pointer 210, and communicates the resultant motion of the pointer 210 to each CIA of the plurality of computing devices 104. The CCS 102 software also determines if the pointer 210 location is successfully targeting one input choice 208 for more than the threshold amount of time. If so, the CCS 102 software determines that the question is answered and communicates the targeted input choice 208 to all members of the group such that it is substantially simultaneously displayed upon the display interface of each computing device 104 included in the group.

In this way, the system 100 of the present invention enables groups of networked users to collaboratively control the graphical pointer 210 in response to one or more questions posed by members of group. More specifically, embodiments of the current system 100 enable each of the plurality of users to view on a screen of their own individual computing devices 104, a representation of the pointer 210 and the target board, and enable each of said users to convey the user intent (also referred to as the user intent value) as to the desired direction (and optionally magnitude) of motion that user wants the pointer 210 to move so as to select one of the input choices displayed on the target area. The user intent is represented as a user intent vector. The user intent vector can be conveyed by the user, for example, by tilting his computing device 104 in the desired direction, swiping the screen in a desired direction, or positioning the mouse such that the graphical magnet icon 306 pulls on the pointer 210 with a desired direction.

In some embodiments, eye tracking hardware and software are included in the computing device 104, for example the eye tracking hardware and software disclosed in U.S. Pat. No. 7,429,108 to the present inventor. The CIA is configured to operate the eye tracking hardware and software and receive input from the eye tracking hardware are software. In the current innovation, a user's gaze is tracked by the CIA and used to compute the user intent vector that represents the user's desired motion of the pointer 210, which is communicated to the CCS 102 software. More specifically, the user's gaze defines a location with respect to the pointer 210. The vector between the location and the center of the pointer 210 is then used by the CIA to compute the magnitude and direction of the user intent vector. In this way, the user can simply look towards a direction that he desires the pointer 210 to move, and the user intent vector is computed by the CIA and sent to the CCS 102 software by the CIA. In some instances the magnet icon 306 or other graphical element is displayed to represent the user intent vector on the display. In this way, the user can participate in the collaborative swarm intelligence experience using a hands-free method.

In some embodiments, a brain-computer interface (sometimes called a mind-machine interface, direct neural interface, synthetic telepathy interface, or a brain-machine interface), is employed to collect the user input of one or more users in the swarm. In some such embodiments, the user's brain-waves are detected by the brain-computer interface as he or she watches the pointer 210 move upon his screen. A calibration session is often required to correlate detected brain activity with a desired direction of motion of the pointer 210, but once that calibration is complete, the brain-computer interface system can be used by the CIA to compute the user intent vector that represents that user's desired motion of the pointer 210 at each time-step during the session, this user intent vector being communicated to the CCS 102 software. In this way, the user can simply think about a direction that he desires the pointer 210 to move, and the user intent vector is computed and sent to the CCS 102 software by the CIA. In some instances the magnet icon 306 or other graphical element is displayed to represent the user intent vector on the screen of the user's computing device 104. In this way, the user can participate in the collaborative swarm intelligence using a hands-free method.

Whatever the input method used (mouse, touchscreen, tilt, eye-tracking, or brain-tracking), the system is configured such that the user intent vector is communicated by the CIA, running on the user's computing device 104, to the Central Collaboration (CCS) 102. The CCS 102 collects the user intent vectors from the plurality of users (via their separate computing devices 104), and then derives a group intent vector that represents the collective will of the group at that time. The group intent vector is then used to compute an updated location of the pointer 210 with respect to the target area and the input choices 208, the updated location reflecting the collective will of the group.

In many preferred embodiments, a physical model is employed in which the pointer 210 is assigned a simulated mass and damping, each user input represented as a simulated force vector. In some such embodiments, the mass and damping of the pointer 210 is adjusted dynamically by the software depending upon a physics mode selected by the user who asks each question by using the physics selection drop-down menu 216 shown in FIG. 2. In some such embodiments, the ice mode can be selected by the user in which the pointer 210 glides very freely as if on ice. In some such embodiments, the heavy mode can be selected by the user in which the pointer 210 requires the collaborative pull of a large majority of members of the swarm to achieve any real velocity. In some embodiments, the mass and damping are dynamically assigned by the software on the CCS 102 depending upon the current size of the swarm, the larger the swarm the higher the mass and higher the damping assigned.

Whether a physics model is used or not, the updated pointer 210 location is then sent by the CCS 102 to each of the computing devices 104 and is used by the CIA running on each of said computing devices 104 to update the displayed location of the pointer 210. In this way, the plurality of users can watch the pointer 210 move, not based on their own individual input, but based on the overall collective intent of the group.

As described in related U.S. patent application Ser. No. 14/668,970, the group intent vector can be computed from the plurality of user intent vectors as a simple average, or may be computed as a weighted average in which some users have more influence on the resulting collective group intent than other users. In such embodiments, the weighting of each user can be derived based on user scores and/or user synchronicity values (also referred to as synchrony values, sync values or performance values) earned during prior interactions with the system 100. In such embodiments, each user may be assigned one or more variables that represents how his or her input should be weighted with respect to other users in the swarm. In some embodiments the variable is called the user contribution index and is updated regularly to reflect the skill of that user in providing input that helps the group reach a coherent collaborative response. The user who demonstrates a history of "constructive input" (i.e. input that is supportive of the collective intent, will be assigned a higher user contribution index than the user who has demonstrated a history of "destructive input" (i.e. input that is substantially resistant to the collective intent). In this way, users are incentivized push for collaborative consensus.

Those users who are supportive to the emerging consensus are determined computationally by the CCS 102 by repeatedly comparing each user's user intent vector with the group intent vector. The more aligned that user's user intent vector is with the direction of the group intent vector, the more collaborative that user is behaving. The further the user intent vector is from the direction of the group intent vector, the less collaborative the user is behaving. This level of collaboration is represented by the value defined herein and in the related applications as the user's synchrony (or synchronicity or sync). The synchronicity value may be an instant synchronicity value, i.e. one at a certain instant in time, or may be a session synchronicity value representing the overall user synchronicity for one or more sessions.

The synchronicity value for each individual user is determined by the CCS 102 by repeatedly comparing the user intent received from each computing device 104 (representing the user input reflecting the user's intent to move the graphical object of the pointer 210 in a given direction) with the group intent derived from all user intents. The synchronicity value of the individual user is determined but computing the difference between the user intent and the group intent. The synchronicity value may be an instant value, i.e., based on a single comparison of the user intent to the group intent at one point in time, or may be synchronicity value over a specific period of time, e.g. an average of the synchronicity values over that period. Thereby, the user synchronicity value each individual user represents at least in part that user's contribution to the collaborative control of the at least one graphical object.

In some embodiments, each individual's synchrony value ranges between an upper bound value and a lower bound value. In one embodiment, the synchronicity value ranges between +1 to −1, with the value +1 (the upper bound) being assigned when the user intent vector is substantially aligned with the group intent vector, and with the value of −1 (the lower bound) being assigned when the user intent vector is substantially in the opposite direction of the group intent vector, with all values between +1 and −1 being used to represent varying degrees of alignment. For example, if the user intent vector is 90 degrees out phase with the group intent vector, a value of 0 is assigned, for that is halfway between fully convergent and fully divergent. Thus, a skilled user is one who is able to convey his individual intent as input, but do so in a cooperative manner. Such a user will maintain a positive synchrony value during much of the session, for he or she is being supportive of the group intent. A user who maintains a positive value will be awarded more points and be assigned a higher user contribution index than a user who does not.

In some embodiments, the user's synchronicity values are computed as a percentage from 0% to 100%, for that is often an easier metric for users to understand. The session synchronicity value of 100% means the user has been perfectly in sync with the swarm. The session synchronicity value of 0% means the user has been entirely out of sync with the swarm. Session synchronicity values between 0% and 100% reflect relative synchronization with the swarm, with a 50% synchronicity value meaning the user was neutral with respect to the swarm.

Referring next to FIG. 4, shown is an exemplary display interface 400 as displayed on the computing device 104 being used by one user of a group, shown at a moment in time after the group has successfully positioned the pointer 210 on one of the input choices 208, selecting the input choice 208 as the target, thereby collaboratively choosing the answer. Shown are the group name 204, the target area 206, the plurality of input choices 208, the communication menu 212, the chat window 218, the chat input box 220, the current member list 222, the statistics display 224, the invite button 226, a prefix text 402, a target text 404, a group cohesiveness score indication 406, a session synchronicity value score indication 408, a points indication 410, an answer window 412, an answer options tab 414, a replay swarm icon 416, and a Tweet answer icon 418.

In this instance, the target is "Gremlins", reflecting the swarm's collaborative will in response to the posed question: "What movie should we see tonight?" As shown in FIG. 4, the target is graphically displayed to each user on the screen of his or her computing device 104 (as controlled by the CIA software running on that device 104). In the embodiment shown, the graphical display includes the answer window 412 including the prefix text 402 "UNUM says:" along with the chosen target: "Gremlins".

In some embodiments, the answer is also displayed in the chat window 218, as if communicated by the personified entity "UNUM" itself. This gives the swarm intelligence a feeling of personality and presence.

Also displayed in the answer window 412 is one or more statistics computed by the CCS 102 software. The statistics may reflect the performance of the group as a whole or reflect the performance of the particular user of that computing device 104. In this example, the group cohesiveness score indication 406, reflecting the synchronicity of the group, is shown of 84%, which indicates that the group was 84% aligned in their imparted motion of the pointer 210. The group cohesiveness score indication 406 includes the text "GROUP SYNC:" The group cohesiveness score of 84% shows strong convergence of group members, reflecting that the swarm intelligence spoke with high "conviction" when answering this question. A low group cohesiveness score would reflect a low conviction for the swarm intelligence. In some embodiments the group cohesiveness score may be repeatedly reported to and repeatedly displayed by each of the computing devices 104, for example during the session.

Also displayed in the answer window 412 is the session user synchronicity value score indication 408. The session user synchronicity value is a statistical indication of how well the particular user of this computing device 104 was aligned in his input with the swarm as a whole. The session synchronicity value score indication 408 includes the text "YOUR SYNC:" and value of 91%. In this case, the user was very highly aligned, achieving a 91% synchronicity value.

Also displayed in the answer window 412 is the points indication 410, indicating the number of points earned by this user as a result of his or her participation during the session. The user in this session has earned 241 points, as shown in the points indication 410. The points indication 410 also includes the text "POINTS:"

Users earn more points (or credits) as a result of being constructively collaborative, helping the swarm reach a meaningful consensus. Users earn less points (credits) as a result of being non-collaborative (obstructive), blocking the swarm from finding a meaningful consensus. In the case where the swarm cannot answer a question within the allotted time because consensus is never reached, all users lose points (credits). This innovative scoring method encourages participants to be collaborative rather than obstructionist, thereby improving the performance of the swarm intelligence.

Also displayed is the answer options tab 414 which gives users options related to the answer that was just reached by the swarm. The user can selectively Tweet® the answer by selecting the Tweet answer icon 418. This triggers a routine within the CIA that sends a Tweet request to the CCS 102 software, which then sends an automated Tweet to Twitter. The Tweet includes the question and the selected answer. The Tweet also includes a numerical indication of the number of users who participated in answering the given question, thus conveying the size of the swarm intelligence which produced this Tweet. The Tweet also includes a hashtag, for example "# UNUMsays", as well as an indication of the group cohesiveness score. In this way, the swarm intelligence system comprised of dozens, hundreds, or even thousands of individual minds working as one can is given a unique voice as a social media entity. Enabling collaborative groups to ask questions, answer questions, and voice the swarm's collaborative intent over Twitter as a unique entity is highly unique and appealing to users. In some embodiments, the decision to Tweet an answer is posed by the software to the swarm. A question appears, e.g. "Should we tweet this?", and a set of answers appear "yes", "no", etc. If the group picks "yes" or an equivalent, the swarm intelligence has decided to send its own Tweet. In this way, the invention described herein enables the formation of a swarm intelligence, enables that swarm intelligence to answer questions, enables that swarm intelligence to consider the answer that emerges and decide if that swarm intelligence wants to Tweet the answer publically.

As also included in the answer options tab 414, each individual user can select a replay swarm icon 416. Upon selection of the replay swarm icon 416, the session resulting in the current answer is replayed on the display. The swarm replay is unique in that it displays an indication of the input of all users in the group at the same time (i.e. the swarm input), giving insight into how the swarm converged upon the collective answer. The video of the swarm input is displayed in high speed (generally 2× to 5× the speed of the real session). This saves time while also conveying a more intuitive display of swarm activity, for the high speed motion of the swarm input indicates the central tendencies more effectively than a real-time display.

Referring next to FIG. 5, a snapshot of an exemplary session replay video 500 is shown. Shown are the target area 206, the plurality of input choices 208, the question display 302, and the plurality of magnet icons 306.

As shown in FIG. 5, the session replay includes the question asked, the answer choices 208, and the graphical indication of the trajectory taken by the pointer 210 during the answer period. As FIG. 5 is a snapshot frame of the replay video, the pointer 210 is shown at a single location, but viewed over time the pointer 210 is shown moving across the target area 206. Also displayed is the graphical indication of the input provided by each user of the swarm at each time-step during the answer session. In this instance, the graphical magnet icon 306 is displayed for each user, the size and orientation of each magnet icon 306 with respect to the pointer 210 indicating the magnitude and direction of that user's user intent vector (magnitude and direction) upon the pointer 210 at each given moment in time. In this example, 8 users were participating in the swarm, collaboratively moving the pointer 210 to an answer. This method is scalable to much larger numbers of users.

In some embodiments where hundreds or even thousands of users are participating at the same time, other innovative methods are employed to make the replay coherent. In one such embodiment, when the number of magnet icons 306 exceeds a threshold, they are grouped and averaged, for example showing one composite magnet icon 306 to represent every group of 10 in the swarm. In this way, a swarm with 800 users can be represented by a replay display of 80 magnet icons 306. This is highly informative to the user, conveying the central tendency of the swarm without overwhelming the display with too many magnet icons 306 (or other graphical indicators). In some embodiments, the user can select the replay speed.

Figure 6:
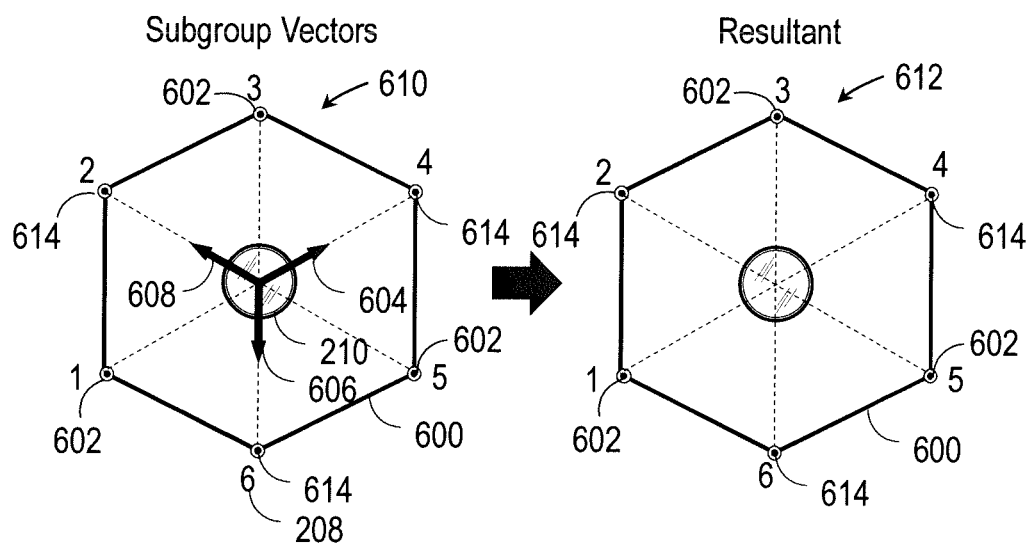
FIG. 6 is a view of a subgroup vector target area and a resultant target area including three subgroup vectors in a first arrangement.
Figure 7:
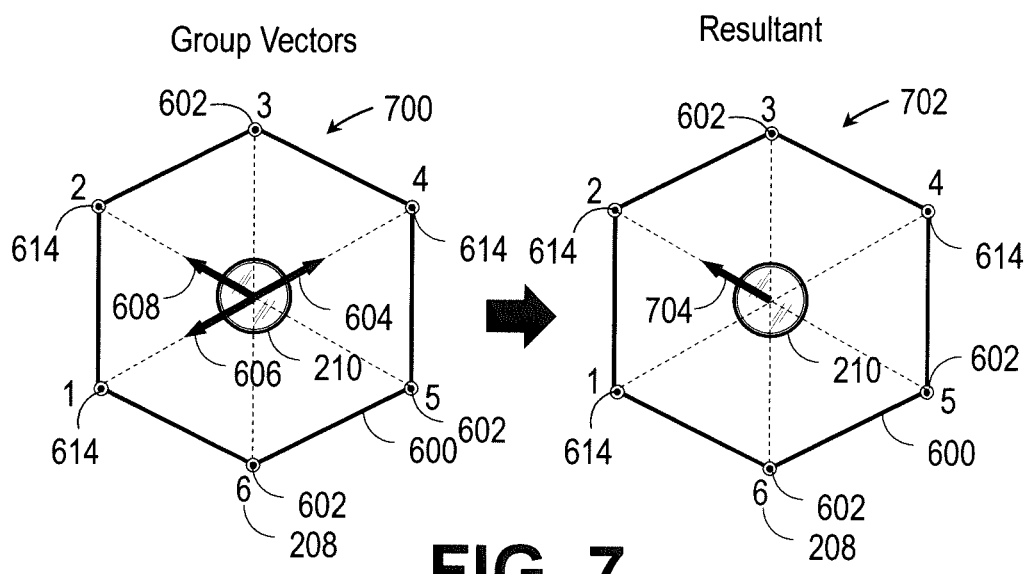
FIG. 7 is a view of a subgroup vector target area and a resultant target area including three subgroup vectors in a second arrangement.
Figure 8:
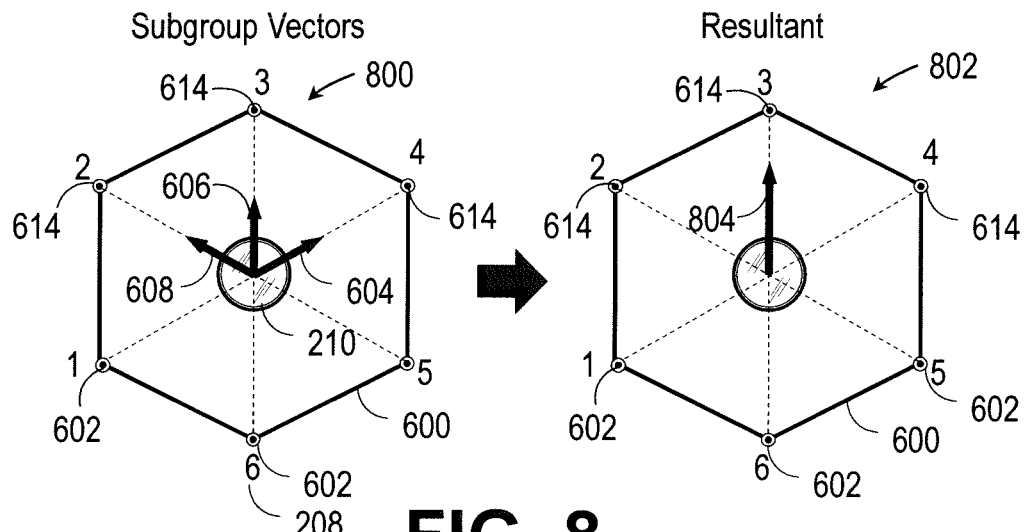
FIG. 8 is a view of a subgroup vector target area and a resultant target area including three subgroup vectors in a third arrangement.

Referring next to FIGS. 6, 7 and 8, exemplary target areas including subgroup vectors and resultant forces are shown. A first arrangement of subgroup vectors is shown in FIG. 6. A second arrangement of subgroup vectors is shown in FIG. 7, and a third arrangement of subgroup vectors is shown in FIG. 8. Shown are the plurality of answer choices 208, the pointer 210, a target shape 600, a plurality of nonpreferred targets 602, a first subgroup vector 604, a second subgroup vector 606, a third subgroup vector 608, a first subgroup vector target area 610, a first resultant target area 612, a plurality of preferred targets 614, a second subgroup vector target area 700, a second resultant target area 702, a first resultant force vector 704, a third subgroup vector target area 800, a third resultant target area 802, and a second resultant force vector 804.

As described in the related patent applications, in many embodiments the input of each user is translated into a virtual vector force, typically referred to as the user input vector. Each user input vector has a magnitude and a direction. The user input vectors of all users of the group are added together by the CCS 102 to result in the group intent vector. An indication of motion of the graphical object (typically the pointer 210) under collaborative control, the indication of motion typically based on the group intent vector, is then sent to the plurality of computing devices. For clarity, the embodiments described herein refer to the group intent vector in lieu of the indication of motion of the graphical object, but it should be understood that the use of the term group intent vector in this context also includes the indication of motion sent from the CCS 102 to the computing devices.

However, due to how the answer choices 208 are arranged geometrically on the target shape 600, in some arrangements the group intent vector may not accurately represent the group intent, and may be considered "biased". The target areas 700, 800 of FIGS. 7, 8 illustrate biasing cases. The target shape 600 in FIGS. 6-8 is a hexagon shape, with each target 602 located at a vertex of the hexagon. The hexagon target shape 600 in the present embodiment is oriented with a single top vertex, i.e. in the pointy orientation. As shown in FIG. 6-8, during the time-step shown in the collaborative session the pointer 210 is located at a center of the hexagon target shape 600.

As disclosed herein and in the co-pending patent applications, some embodiments of the present invention are configured to provide the swarm of users with six targets, with each target located at the vertex of a hexagon shape and associated with one answer choice 208. The six targets are arranged such that they are approximately equally spaced from the starting location of the puck 210 at the center of the hexagon target shape 600. This layout was chosen inventively to create an environment conducive for collaborative decision-making by real-time social swarms.

Although larger numbers of answer choices 208 could be presented, six was employed because traditional social science research has demonstrated that giving people too many options to choose from decreases the motivation to choose, decreases the satisfaction with the chosen option, and increases negative emotions, including disappointment and regret, a phenomenon often described as "choice overload".

Still, there is one downside to a spatial layout of discrete answer choices 208. The layout of spatially arranged choices other around the hexagon target shape 600 (or around other chosen shapes) can sometimes cause biasing effects such that some answer choices 208 are more likely to be chosen by the real-time swarm of users due entirely to the relative placement of options around the hexagon target shape 600. This can cause distorted results.

Biasing effects, such as those illustrated in FIGS. 7 and 8, can occur when the swarm of users splits into a plurality of factions, or subgroups, each subgroup including a portion of the users and each subgroup preferring a different target. For convenience, we call these targets the "preferred targets", and the remaining targets "nonpreferred targets". The distribution of the plurality of preferred targets 614 around the hexagon target shape 600 can cause biasing effects in some situations, giving a biasing advantage to one or more of the preferred targets 614 over other of the preferred targets 614. "Biasing advantage" is herein taken to mean that the swarm may be more likely to converge on one preferred target for no reason other than its geometrical location relative to the other preferred targets 614.

For example, if more of the preferred targets 614 happen to be on the same side of the hexagon target shape 600 with respect to the puck 210 as compared to fewer of other preferred targets 614, those same-side preferred targets 614 may have a biasing advantage over the other-side preferred targets 614.

In the exemplary first subgroup vector target area 610 and the first resultant target area 612 of FIG. 6, the user intent vectors have been resolved into three subgroup (faction) vectors for clarity: the first subgroup vector 604, the second subgroup vector 606, and the third subgroup vector 608. In the example of FIG. 6, each subgroup intent vector has the same magnitude.

In FIGS. 6-8, each subgroup vector 604, 606, 608 is of equal magnitude, and each subgroup vector 604, 606, 608 has a direction directly towards a different preferred target 614. This should result in the same effect on the puck 210 for each of the target areas 610, 700, 800 in FIGS. 6-8: as each subgroup is "pulling" for one preferred target 614 at equal magnitude, a stalemate should occur, with the subgroup vectors 604, 606, 608 canceling each other out and the group intent vector equal to zero.

However, due to the graphical geometry of the target shape 600, the resultant group intent vector will be different depending on the relative geometrical locations of the preferred targets.

Referring again to FIG. 6, the first subgroup vector target area 610 is shown for the case where the preferred targets 614 are equally separated, i.e. angles between adjacent subgroup vectors 604, 606, 608 are the same (120 degrees). As shown in FIG. 6, first subgroup vector 604 is in the 2-o'clock direction (pointing towards the target 614 associated with the answer choice labeled "4"), the second subgroup vector 606 is in the 6-o'clock direction (pointing towards the target 614 associated with the answer choice labeled "6"), and the third subgroup vector 608 is in the 10-o'clock direction (pointing towards the target 614 associated with the answer choice labeled "2"). When the subgroup vectors 604, 606, 608 are resolved into the single group intent vector, the subgroup vectors 604, 606, 608 cancel each other and the group intent vector is equal to zero, as shown as the absence of a vector arrow in the first resultant target area 612.

In FIG. 6 there are three factions (subgroups) of users, each of which is pulling towards one of the three preferred targets 614, none of which are neighboring targets. In this situation, there is no biasing advantage because the subgroup vectors 604, 606, 608 applied by the three factions are evenly distributed around the hexagon target shape 600. The puck 210 will only move based on the will of the factions. In the instant shown in FIG. 6, the three factions are evenly balanced and so the puck 210 will not move until members of the swarm shift their alliance from one faction to another, or if other members join in the pull who are currently not pulling, thus giving one faction an advantage. Regardless of how those force dynamics play out, the decision process is unbiased for it depends entirely on the forces that are applied by the members of the swarm and NOT on the positional layout of the targets 602, 614.

Referring next to FIG. 7, a second arrangement of subgroup vectors 604, 606, 608 is shown. The subgroup vectors are of equal magnitude. The first subgroup vector 604 is again oriented in the 2-o'clock direction, and the third subgroup vector 608 is in the 10-o'clock direction, but the second subgroup vector 606 is now in the 8-o'clock direction (pointing towards the target 614 associated with the answer choice labeled "1"). Thus an angle between the first subgroup vector 604 and the second subgroup vector 606 is now 180 degrees, and the angle between the second subgroup vector 606 and the third subgroup vector 608 is 60 degrees. When the subgroup vectors 604, 606, 608 of FIG. 7 are summed, the first resultant force vector 704 is shown in the second resultant target area 702. The first subgroup vector 604 and the second subgroup vector 606 cancel each other out, leaving the group intent vector (the second resultant force vector 704) equal to the third subgroup vector 608 in the 10-o'clock direction.

As shown in FIG. 7, there are three factions of users each pulling towards a different preferred target 614, but in this case two of the preferred targets 614 (associated with answer choices 208 "1" and "2" in FIG. 7) are neighboring targets 614. As a consequence, the puck motion is biased towards a left side of the hexagon target shape 600. The reason for this is entirely because of the spatial geometrical layout of the preferred targets 614 that causes more pull to the left than to the right. This is an artificial bias because it has nothing to do with the will of the group. The group is evenly balanced and so the puck 210 should be generally still, stuck in a stalemate situation until the dynamics change through intragroup changes. To compound the problem, two preferred targets 614 are opposite of each other (those associated with answer choices labeled "1" and "4") with respect to the puck 210. In other words, the faction pulling towards answer choice "1" and the faction pulling towards answer choice "4" will cancel each other's pulls. This means the puck 210 will move towards the preferred target 614 associated with answer choice 2. This is a significant issue because there is no reason the swarm should pick answer choice "2" over answer choice "1" or answer choice "4" other than the positional placement of the preferred targets 614. This is called "positional bias" and is a definitive biasing effect that needs to be addressed with an inventive solution.

Referring next to FIG. 8, a third arrangement of subgroup vectors 604, 606, 608 is shown. The subgroup vectors are again of equal magnitude. In the third arrangement the first subgroup vector 604 is in the 2-o'clock direction, and the third subgroup vector 608 is in the 10-o'clock direction, but in FIG. 8 the second subgroup vector 606 is in the 12-o'clock direction (pointing towards the target 614 associated with the answer choice labeled "3"). The second subgroup vector 606 is separated from the first subgroup vector 604 and the third subgroup vector 608 by 60 degrees. The first subgroup vector 604 and the third subgroup vector 608 are separated by 240 degrees. When the subgroup vectors 604, 606, 608 of FIG. 8 are summed, as shown in the third resultant target area 802, the horizontal components of the first subgroup vector 604 and the third subgroup vector 608 cancel each other out, leaving the group intent vector equal to the second subgroup vector 606 added to the vertical components of the first subgroup vector 604 and the third subgroup vector 608, all oriented in the 12-o'clock direction.

In FIG. 8 there are again three factions of users, each pulling towards one of the three preferred targets 614, but in this case three of the preferred targets 614 (associated with answer choices 208 labeled "2", "3" and "4") are neighbors. As a consequence, the puck 210 will move towards the top of the hexagon target shape 600 and the preferred target 614 associated with answer choice "3". Of course, the pointer 210 should move in that direction since all three preferred targets 614 are on that portion of the hexagon target shape 600 and thus upward motion reflects the true will of the group. Still, a significant biasing problem emerges as the puck 210 heads upward. This is because two of the preferred targets 614 ("2" and "4") fall on opposite sides of the puck 210. This means that the first subgroup vector 604 and the third subgroup vector 608 from the factions pulling towards those preferred targets 614 cancel each other out in the horizontal component of their pulls.

Referring again to FIGS. 6-8, positional bias emerges when three factions pull towards three different preferred targets 614 which are positioned such that two of the subgroup vectors have opposing forces that cancel, allowing the puck 210 to proceed to the third preferred target for no reason other than the preferred target 614 location on the hexagon target shape 600. This situation arises in two unique situations. Either when two preferred targets 614 are neighbors and the third preferred target 614 is directly opposite one of those two targets (as shown in FIG. 7), or when the three preferred targets 614 are neighbors (as shown in FIG. 8).

For situations with only two factions/subgroups, biasing does not substantially occur as described previously. Biasing also does not occur with four factions/subgroups. That's because for a hexagon layout, four targets always have two pairs on opposing sides of the puck 210. Positional biasing can occur with five factions, but because the total force is split five ways, the bias is smaller than the three faction examples. Thus, if the three faction problem caused by FIGS. 7 and 8 above is solved, the five faction problem is also solved.

Fortunately, a single novel solution can address most situations. More specifically, the problem can be solved if the CCS 102 software is configured to introduce a low-level restoring force vector, similar to the gravity force described in related applications, that acts to pull the puck 210 back towards the center of the hexagon target shape 600. This restoring force vector should be sized such that it is large enough to neutralize a biased preferred target 614 by countering the biased force resultant (such as first resultant 704 and second resultant 804), thus putting disadvantaged preferred targets 614 on equal footing with the advantaged preferred target 614. The restoring force vector should also be of a magnitude small enough that the effect of the restoring force vector on the puck motion is barely noticeable to users.

In the gravity mode, as described in co-pending applications, the CCS 102 software imparts the simulated restoring force vector that pulls the puck 210 back to a point substantially centered among the plurality of the given targets 602, 614, a magnitude of the restoring force vector a function of distance from the center point. As disclosed, this restoring force vector can be configured to increase in magnitude as the puck 210 increases its distance from the center. In this way, the effect on the pointer motion feels like "gravity" to the users, pulling the puck 210 back to the center of the target shape 600 unless opposed by the group intent vector.

In many preferred embodiments of the gravity force mode, the restoring force vector increases linearly in magnitude with distance from the center, and reaches (and maintains) a maximum force after the puck 210 has been moved beyond a threshold distance from the center. When the maximum magnitude has been reached, the restoring force vector is "saturated". This gives the restoring force vector a predictable profile and creates an upper bound for the restoring force vector magnitude. In one current embodiment, the restoring force vector is configured such that the CCS 102 software imparts a restoring force vector equal to 0 when the puck 210 is centered, with the restoring force vector increasing linearly with increasing distance from the center until the restoring force vector magnitude reaches a maximum magnitude at a distance of 200 pixels, wherein the restoring force vector magnitude ceases to increase. In one embodiment, an algorithm determining the magnitude of the restoring force vector includes a maximum magnitude value of the restoring force vector, a group force value, equal to 35% of the total possible force that the current users could collaborate to apply to the puck 210 if all were working in perfect alignment (also known as the maximum force value). The maximum force value is the number of users in the group multiplied by the maximum possible user intent magnitude. The algorithm determining the restoring force vector is an inventive feature for the magnitude value of the restoring force vector depends on how many users are currently in the swarm, thus scaling the upper bound of the restoring force vector magnitude based on the number of users in the group. If there are many users, the maximum restoring force vector magnitude is a higher value than if there are fewer users. In many embodiments, the maximum restoring force vector magnitude increases (scales) linearly with the number of users in the current swarm. In one such embodiment the linear scale relationship is 0.35 to achieve the aforementioned 35% value.

The introduction of the restoring force vector by the CCS 102 software has the effect of creating a new collaborative dynamic in which the members of the swarm must pull on the puck 210 with a collective force that overcomes the restoring force vector in order to select one of the plurality of targets 602, 614.

This significantly alters the swarm dynamics, for it now requires more than a simple plurality of users pulling on the puck 210 in a substantially synchronized manner in order to position the puck 210 on a given target 602, 614. In a standard non-gravity mode, if there were 100 users, with 51 pulling towards one answer, and 49 pulling towards another, the 51 would likely be able to position the puck 210 to select the desired answer choice 208. But with an introduced restoring force vector of sufficient magnitude, the system 100 can be configured to require that at least 80% (i.e. 80 users of the 100 in the swarm at the present time) to be pulling in a substantially similar direction to overcome the restoring force vector and position the puck 210 on the desired target.

This inventive feature thus enables a high barrier for collaborative decision making, forcing the group to have more "conviction" in the resulting response. Said another way, this inventive use of the restoring force vector forces the swarm of users to achieve a higher level of consensus among the pool of members in order for a decision to be achieved. This promotes negotiation and consensus-building, and leader to an improved dynamic in which users are more apt to find common ground that satisfies the majority.

In some embodiments, the magnitude of the restoring force vector is user-selectable, thereby adjusting the level of conviction required to overcome the restoring force vector and reach one target 602, 614.

In some novel embodiments, the user of "smart gravity" is employed, the restoring force vector magnitude is scaled not by the total possible force (the maximum force value) that the swarm of users could apply on the puck 210 but by the actual sum of the user input vectors applied by the swarm at the current time-step. Thus if the swarm is applying a high level of force, the maximum restoring force vector magnitude is scaled upwards as compared to if the swarm is applying a low level of force. This allows the restoring force vector magnitude to be adjusted not based on how many users are in the swarm but based on how many users are actually pulling on the puck 210 at the given time-step. The more the swarm is pulling on the puck 210, the greater the upper bound of the magnitude of the restoring force vector. In preferred embodiments, the restoring force is dropped to 0 or near 0 by the CCS 102 software when the sum of user input vectors on the puck 210 falls below a given threshold. This ensures that if nobody is pulling on the puck 210, the restoring force vector drops to zero as well. This ensures the puck 210 never appears to move on its own with nobody engaging the puck 210, for the opposing restoring force vector only kick in when there is a force on the puck 210 above the given threshold.

In many embodiments of the smart gravity feature described above, the aforementioned sum of user forces is a scalar sum. This means the summation of the magnitudes of the user intent vectors applied to the puck 210 by the plurality of users without consideration of the user input vector directions. Thus the scalar sum is the absolute value of applied user input vectors, indicating how much pull is being applied to the puck 210 regardless of direction. This is highly effective for it gives an indication of swarm pull regardless of whether some members' user input vectors are canceling out other members' user input vectors due to opposing directions.

Figure 9:
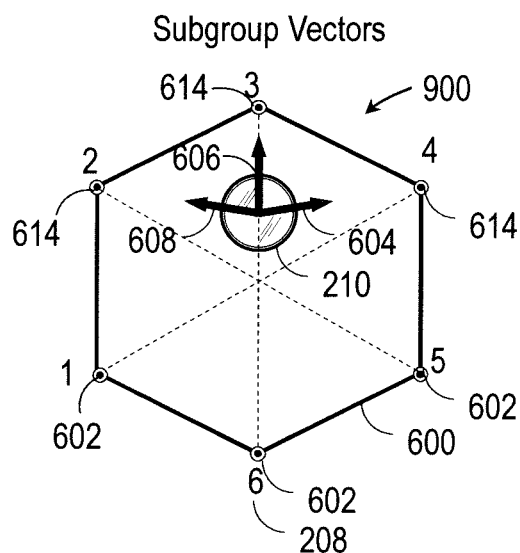
FIG. 9 is a view of a subgroup vector target area and a resultant target area including the third arrangement at a subsequent time-step.

Referring next to FIG. 9, an exemplary subgroup vector target area 900 is shown. Shown are the plurality of answer choices 208, the puck 210, the target shape 600, the plurality of nonpreferred targets 602, the first subgroup vector 604, the second subgroup vector 606, the third subgroup vector 608, and the plurality of preferred targets 614.

The exemplary subgroup vector target area 900 shows the exemplary subgroup vector target area 800 (FIG. 8) at a subsequent time-step when the pointer 210 has moved vertically in response to the subgroup vectors 604, 606, 608.

As shown in FIG. 9, the pointer 210 has moved upwards to a new location on the target area 900 as a result of the three subgroup vectors 604, 606, 608 acting on the puck 210. As in FIG. 8, the subgroup vectors 604, 606, 608 are directed towards answer choices 208 labeled "2", "3" and "4". Because horizontal components of the first subgroup vector 604 in the direction of answer choice "2" and the third subgroup vector 608 in the direction of answer choice "4" cancel each other out, and the vertical components of the first subgroup vector 604 and the third subgroup vector 608 are in the direction of answer choice "3", the net pull on the puck will be directly towards answer choice 3, i.e. in a vertical upward direction. This means the puck will move towards answer choice "3" simply because answer choice "3" happens to be the middle preferred target 614 of the three neighboring preferred targets 614, not because there is a stronger faction pulling towards answer choice "3". This too is a clear case of positional biasing that needs to be addressed with an inventive solution.

Thus we see that positional bias emerges when three factions/subgroups pull towards three preferred targets 614 which are positioned such that two of the subgroup vectors have opposing forces that cancel, allowing the puck 210 to proceed to the third preferred target for no reason other than the preferred target's location on the hexagon target shape 600. This situation arises in two unique situations for the hexagon target shape 600. Either when two preferred targets 614 are neighbors and the third preferred target 614 is directly opposite one of those two preferred targets 614 (as shown in FIG. 8), or when the three preferred targets 614 are neighbors (as shown in FIG. 9).

For situations with only two factions/subgroups, the positional bias does not occur as described previously. Positional biasing also does not occur with four factions. That's because for the hexagon target shape 600, four preferred targets 614 always have two pairs on opposing sides of the puck 210. Positional biasing can occur with five factions, but because the total force is split five ways, the positional bias is smaller than the three faction examples. Thus, solving the three faction problem caused by the configurations shown in FIGS. 7 and 8 above, the five faction problem also solved.

Fortunately, a single novel solution can address most situations. More specifically, the problem can be solved if the CCS 102 software is configured to introduce a bias restoring force vector 1002 that always acts in the direction to pull the puck 210 back towards the center of the hexagon target shape 600. The bias restoring force vector 1002 acts similarly to the gravity restoring force vector of the gravity mode previously described. The bias restoring force vector 1002 should be sized such that the bias restoring force vector 1002 is large enough to correct the positional biasing, by countering the biasing resultant force, thus putting the disadvantaged preferred targets 614 on equal footing with the advantaged preferred targets 614. The bias restoring force vector 1002 should also be sized small enough that the additional movement of the pointer 210 due to the bias restoring force vector 1002 is barely noticeable to users.

Consider the three-neighbor situation shown in FIG. 9. At the moment in time depicted, the puck 210 will easily proceed to the answer choice 208 labeled '3' for no reason other than the positional layout. That said, at the shown moment, three factions are pulling equally towards three preferred targets 614. This should be a stalemate situation in the swarm, requiring members to switch their views and find a compromise. The CCS 102 software can be configured to induce this stalemate by introducing the appropriately sized bias restoring force vector 1002 that pulls back toward the center of the target shape 600, as described below in FIG. 10. In one preferred embodiment, the magnitude of the bias restoring force vector 1002 is sized to increase linearly with a distance of the pointer 210 from the center and is configured in the CCS 102 software to reach a maximum magnitude of 16% of the maximum force value that the full swarm can apply to the puck 210. This maximum magnitude and linear increase was chosen to be barely noticeable by users due to the smooth ramp up and low magnitude, but still be effective in combating the positional bias. Also, it's important to choose the lowest (or almost lowest) bias restoring force vector 1002 magnitude that solves the problem because higher restoring force vector 1002 magnitudes will make it more difficult to choose desired targets.

Figure 10:
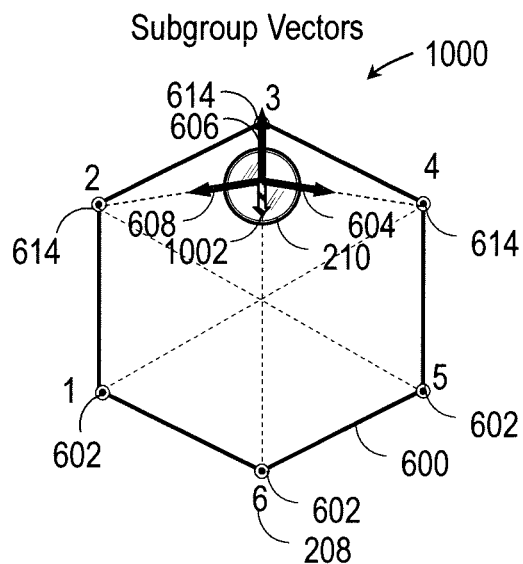
FIG. 10 is a view of an exemplary subgroup vector target area including three subgroup vectors and a bias restoring force.

Referring next to FIG. 10, an exemplary subgroup vector target area 1000 including the bias restoring force vector 1002 is shown. Shown are the plurality of answer choices 208, the puck 210, the target shape 600, the plurality of nonpreferred targets 602, the first subgroup vector 604, the second subgroup vector 606, the third subgroup vector 608, the plurality of preferred targets 614, and the bias restoring force vector 1002.

The subgroup vector target area 1000 is the same as the subgroup vector target area 900 of FIG. 9, with the addition of the bias restoring force vector 1002.

As shown in FIG. 10, the puck 210 has approached the preferred target 614 associated with the answer choice 208 labeled "3" even though the swarm is split into three equal subgroups which have pulled towards the preferred targets 614 associated with the answer choices 208 labeled "2", "3", and "4". To neutralize the resulting positional bias, the bias restoring force vector 1002 is applied with the bias restoring force vector 1002 originating at the center of the pointer 210 (such that the center of the pointer is then the "origin position") and directed towards the center of the target shape 600. The bias restoring force vector 1002 has a magnitude such that the bias restoring force vector 1002 generally neutralizes the positional bias, but not so large that the magnitude of the bias restoring force vector 1002 causes other problems as described above. The bias restoring force vector 1002 magnitude in some embodiments is equal to 16% of the maximum force value of the plurality of users, but it will be understood that other percentages may be used.

Figure 11:
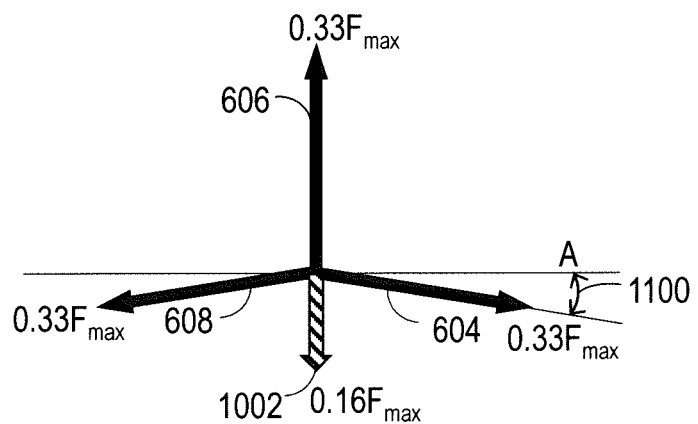
FIG. 11 is a view of an exemplary force diagram of the subgroup vectors and the bias restoring force.

Referring next to FIG. 11, an exemplary force diagram of the subgroup vectors 604, 606, 608 and the bias restoring force vector 1002 is shown. Shown are the first subgroup vector 604, the second subgroup vector 606, the third subgroup vector 608, the bias restoring force vector 1002, and the force vector angle 1100.

For exemplary case of FIG. 11, all users are assumed to be providing the maximum user input, i.e. the maximum force value $F_{max}$ is currently acting on the pointer 210. For the sum of all of the user intent vector magnitudes equal to $F_{max}$, i.e. the total force exerted by the group, each subgroup vector 604, 606, 608 then has a magnitude equal to 33% of $F_{max}$, i.e. $0.33*F_{max}$. For the pointer 210 located in the position as shown in FIG. 10 and the bias restoring force vector 1002 having reached the maximum magnitude defined as 16% of Fmax (0.16*Fmax), the force vector angle ("A") 1100 can be determined for the case where the bias restoring force vector 1002 has caused the sum of all forces to equal zero, i.e. the pointer 210 does not move.

To determine this, a geometric analysis of all force vectors is calculated. The equilibrium equation for the three subgroup vectors 604, 606, 608 and the bias restoring force vector 1002 is written, then solved for the force vector angle 1100, "A". By inspection, the horizontal components of the first subgroup vector 604 and the third subgroup vector 608 cancel, and are omitted from the equilibrium equation for clarity.

$$0.33F_{max}=2*[0.33F_{max}*\sin(A)]+0.16F_{max}$$

After solving the equilibrium equation, the force vector angle 1100 "A" is approximately 15 degrees. This means, as the puck 210 moves upward towards the target 614 associated with answer choice "3", the pointer 210 will fall into a stalemate configuration (i.e. stop moving) when the force vector angle 1100 "A" reaches approximately 15 degrees.

Figure 12:
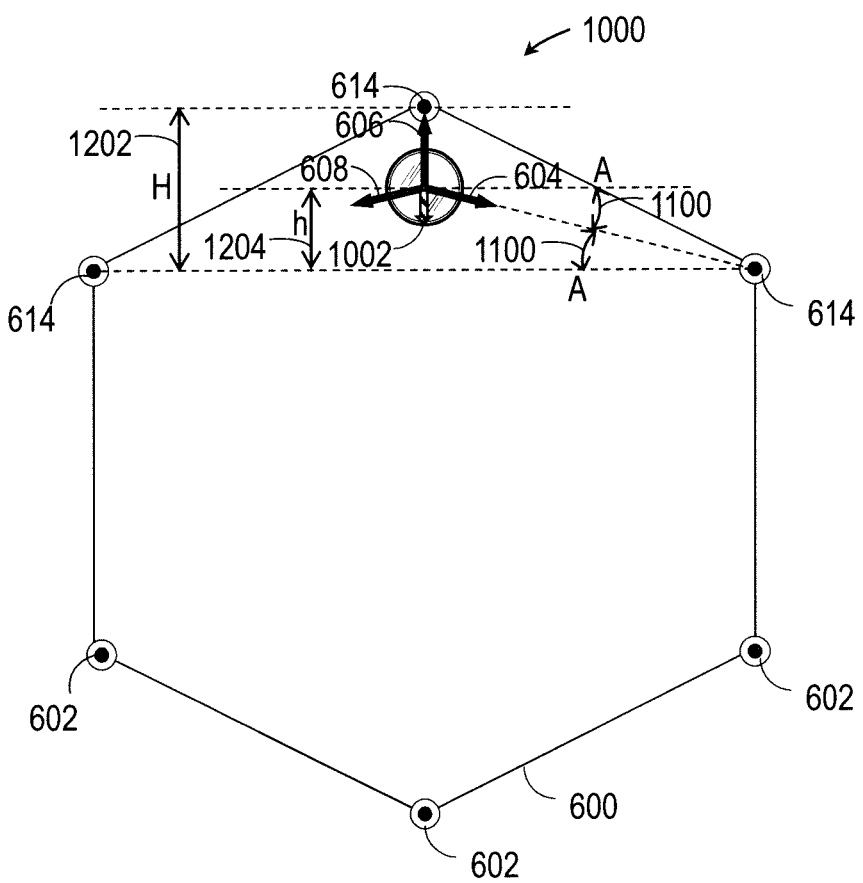
FIG. 12 is a detailed version of the view of the exemplary subgroup vector target area of FIG. 10.

Referring next to FIG. 12, a detailed version of the exemplary target area 1000 of FIG. 10 is shown including geometric dimensions. Shown are the first subgroup vector 604, the second subgroup vector 606, the third subgroup vector 608, the bias restoring force vector 1002, the force vector angle 1100, the hexagon dimension H 1202, and the pointer location dimension 1204.

The exemplary target area 1200 illustrates the pointer 210 position relative to the hexagon target shape 600 for the force equilibrium arrangement shown in FIG. 11.

For a top triangular portion of the hexagon target shape 600 bounded by the top three vertices (answer choices 208 labeled "2", "3" and "4"), the triangular portion has a height equal to the hexagon dimension H 1202 as defined by the hexagon geometry. At the equilibrium position previously defined, the pointer 210 is at the pointer 210 location. The pointer location is defined by the pointer location dimension 1204 ("h"), a vertical distance between the base of the triangular portion and the center of the pointer 210. For the force vector angle 1100 previously determined (approximately equal to 15 degrees), the pointer location dimension 1204, "h", is approximately of the hexagon dimension 1202, "H".

Therefore, in the exemplary force system shown in FIGS. 10-12, equilibrium will happen when the puck 210 is approximately half the vertical distance between the opposing preferred targets 614 (answer choices labeled "2" and "4") and the preferred target 614 associated with answer choice "3", as shown in FIG. 12. Thus, by configuring the CCS 102 server to introduce a mild restoring force vector that has a maximum magnitude of only 16% of $F_{max}$, the system 100 will generally neutralize positional bias when the puck 210 reaches approximately the vertical midpoint among the preferred targets 614 in question. At this point, the puck 210 will be in a stalemate configuration, as it should be if the swarm is split into three equal factions pulling towards three different preferred targets 614. The only way for the stalemate to be broken is if the group negotiates in real time, members of various factions defecting to other factions or forming new factions to pull towards alternate targets, thus shifting the puck 210 out of the stalemate.

The same restoring force method will achieve a similar bias blocking effects when five factions are pulling towards five different preferred targets. Because the force magnitude levels are lower when split among five factions, even lower forces are needed to result in equilibrium. In this way, bias restoring force vectors which are low enough in value they are hardly noticeable by users can be applied to mitigate the likely positional biasing configurations in the standard hexagonal target layout. For layouts with larger numbers of choices, the same method can be applied, the forces sized for the configuration in question.

It should be noted that because this is a real-time closed-loop system, the users generally swing their magnet icons 306 away from their desired targets to achieve higher leverage when trying to block an undesired decision. By swinging magnet icons 306 to amplify leverage, users self-correct against position bias, reducing the magnitude of the effect. This means in practice, the stalemate configuration will be even further from the biased target than shown in FIG. 12. That's a good thing, since the ideal configuration is such that the stalemate configuration is nearly equidistant from the three preferred targets.

As shown above, the magnitude of the bias restoring force vector 1002 is sized based at least in part on the total possible force (the maximum force value) the current swarm can apply to the puck 210. This maximum force value is termed $F_{max}$. In some embodiments the magnitude of the bias restoring force vector 1002 is a function of the maximum force value. In one embodiment the function is 16% of $F_{max}$. In many cases the resulting bias restoring force vector 1002 magnitude is larger than it needs to be because the full swarm is not engaged in pulling on the puck 210 at a given moment in time. Thus, a more refined method that keeps the bias restoring force vector 1002 magnitude even lower and thus less disruptive has the CCS 102 software use a sum of the user input vectors that are being applied to the puck 210 at any moment in time as the basis for the maximum bias restoring force vector 1002 magnitude.

The summed force is termed $F_{sum}$, with $F_{sum}$ defined as the scalar sum of all the user input vectors applied to the puck 210 at each time-step, as determined by the CCS 102 software. Thus the scalar sum is the absolute value of the currently applied user input vectors, indicating how much pull is being applied to the puck 210 regardless of direction.

Use of $F_{sum}$ to calculate the bias restoring force vector 1002 in lieu of $F_{max}$ is highly effective for it gives an indication of the swarm's current total pull regardless of whether some members' pulls are canceling out other members' pulls due to opposing directions. In some embodiments the magnitude of the bias restoring force vector 1002 is a function of the summed force $F_{sum}$. In one embodiment the function is 16% of $F_{sum}$. If all users are pulling and split into three factions, the value will end up the same as the 16% of $F_{max}$ described previously, but for other cases where participation is not full, a more efficient and lower value will result. This will eliminate the situation where not all swarm members are participating and so the swarm struggles to overcome the restoring force when going to a valid target.

Another alternate method is configured such that the CCS 102 software determines the actual number of factions/subgroups in the swarm at each time step, this determination made by comparing the user intent vectors and identifying groupings of users who have user intent vector directions that fall within a certain threshold limit of each other. This threshold limit could be, for example, and angular range of 20 degrees. Thus the CCS 102 software compares the user intent vectors from all users in the swarm and finds grouping of users whose user intent vector directions all fall within a 20 degree range of each other. Each of these groupings is counted as a faction/subgroup within the swarm. The CCS 102 software thus maintains a faction tally at each time-step, the faction tally including the subgroups and the users in each subgroup.

If there are only 1 or 2 factions, the CCS 102 software is configured to not apply the bias restoring force vector 1002 because positional bias cannot happen with less than 3 factions. If there are 3 or 5 factions, the CCS 102 can be configured to employ the positional bias methods described above. This said, the bias restoring force vector 1002 value can also be configured to be lower for a 5 faction tally as compared to a 3 faction tally because the factions each have a smaller percentage of the users in the swarm.

If there are 4 or 6 factions, the CCS 102 software can be configured to not apply the bias restoring force vector because in the 4 or 6 faction configuration, positional bias effects are small or nonresistant for hexagon layouts. Of course, because this is layout dependent, the CCS 102 software can be configured to turn on or turn off bias restoring force vectors, or resize bias restoring force vectors, based on the number of factions, to appropriately combat positional bias for each of a variety of different target shapes and/or layouts.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A real-time collaborative control system for a group of users in real-time collaborative control of a graphical object, comprising:

a plurality of computing devices, each user of the group of users associated with one of the plurality of computing devices, each computing device comprising a communications infrastructure coupled to each of a processor, a memory, a display, and a user interface configured to receive input from a user in real-time;

a collaborative intent application stored on each memory and configured to run on each processor to:

convey to the associated user, using the display, a question including a prompt and a set of answer choices corresponding to the prompt, wherein each of the answer choices is associated with one of a plurality of graphical target locations on the display;

receive, repeatedly in real-time, user input having a direction and a magnitude;

send, repeatedly in real-time, the user input to a collaboration server;

receive, repeatedly in real-time, an indication of motion of the graphical object from the collaboration server; and update, repeatedly in real-time, the location of the graphical object the display relative to an origin location, wherein the displayed location is based at least in part on the indication of motion and is substantially synchronized with the location displayed by other computing devices of the plurality of computing devices; and the collaboration server in networked communication with the plurality of computing devices, the collaboration server including a server processor and a server memory, the server processor configured to run a collaboration mediation application stored on the server memory, the collaboration mediation application configured run on the server processor to:

receive, repeatedly in real-time, the user input;

determine, repeatedly in real-time, a group force vector based on the user input having a group force magnitude and a group force direction, wherein at any given time the group force vector comprises a current group force magnitude and a current group force direction;

determine repeatedly in real time, a restoring force vector having a restoring force magnitude and a restoring force direction, the restoring force magnitude being computed based at least in part on a current distance between the collaboratively controlled graphical object and the origin location and wherein the restoring force direction is from the graphical object to the origin location;

determine, repeatedly in real-time, the collaboratively controlled motion of the graphical object based at least in part upon the group force vector and the restoring force vector; and sending, repeatedly in real-time, the indication of motion of the graphical object to the plurality of computing devices, the indication of motion based at least in part on the group force vector and the restoring force vector, whereby a closed-loop system is formed between the collaboration server and the plurality of computing devices.

2. The control system of claim 1 wherein the restoring force vector increases in magnitude with increasing distance from the origin location.

3. The control system of claim 2 wherein the restoring force vector saturates in magnitude with increasing distance once a maximum magnitude is reached.

4. The control system of claim 1 wherein the magnitude of the restoring force vector is also computed based also upon the current group force magnitude.

5. The control system of claim 4 wherein the restoring force vector increases in magnitude with increasing group force magnitude.

* * * * *

UNITED STATES PATENT AND TRADEMARK OFFICE
CERTIFICATE OF CORRECTION

PATENT NO. : 10,609,124 B2
APPLICATION NO. : 16/130990
DATED : March 31, 2020
INVENTOR(S) : Rosenberg It is certified that error appears in the above-identified patent and that said Letters Patent is hereby corrected as shown below:

On the Title Page

Page 2, Column 1, Line 14, delete "14/738,768" and insert --15/910,934 filed on March 2, 2018, now Pat. No. 10,606,463, which is a continuation of Application No. 14/738,768--.

Page 2, Column 1, Line 20, delete "14/668,970" and insert --15/959,080 filed April 20, 2018, now Pat. No. 10,606,464, which is a continuation of Application No. 15/936,324 filed March 26, 2018, now Pat. No. 10,599,315, which is a continuation of Application No. 14/668,970--.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*